(12) United States Patent
Fukasawa et al.

(10) Patent No.: US 11,084,371 B2
(45) Date of Patent: Aug. 10, 2021

(54) MOTOR DRIVE DEVICE

(71) Applicants: SHOWA CORPORATION, Saitama (JP); HONDA MOTOR CO., LTD., Tokyo (JP); F-TECH INC., Saitama (JP)

(72) Inventors: Kenji Fukasawa, Tochigi (JP); Kenji Kato, Tochigi (JP); Hiroyuki Takahashi, Tochigi (JP); Yutaka Hozumi, Saitama (JP); Sumitaka Ito, Saitama (JP); Junichi Midorikawa, Tochigi (JP); Masayuki Sasaki, Tochigi (JP)

(73) Assignees: SHOWA CORPORATION, Saitama (JP); HONDA MOTOR CO., LTD., Tokyo (JP); F-TECH INC., Saitama (JP)

( * ) Notice: Subject to any disclaimer, the term of this patent is extended or adjusted under 35 U.S.C. 154(b) by 179 days.

(21) Appl. No.: 16/468,248

(22) PCT Filed: Dec. 28, 2017

(86) PCT No.: PCT/JP2017/047222
§ 371 (c)(1),
(2) Date: Jun. 10, 2019

(87) PCT Pub. No.: WO2018/131504
PCT Pub. Date: Jul. 19, 2018

(65) Prior Publication Data
US 2020/0009959 A1 Jan. 9, 2020

(30) Foreign Application Priority Data

Jan. 10, 2017 (JP) .............................. JP2017-001581
Jan. 10, 2017 (JP) .............................. JP2017-001582
Jan. 10, 2017 (JP) .............................. JP2017-002096

(51) Int. Cl.
*B60K 7/00* (2006.01)
*B60G 9/04* (2006.01)

(52) U.S. Cl.
CPC .................. *B60K 7/00* (2013.01); *B60G 9/04* (2013.01); *B60K 2007/0046* (2013.01)

(58) Field of Classification Search
CPC .............. B60K 2007/0061; B60K 7/00; B60K 2007/0046; B60K 7/0007
See application file for complete search history.

(56) References Cited

U.S. PATENT DOCUMENTS 9,132,723 B2 * 9/2015 Munster ................ B60K 17/046
9,604,531 B2 * 3/2017 Tamura ................ B60G 21/051
(Continued)

FOREIGN PATENT DOCUMENTS

DE 10 2010 049 608 A1 5/2011
DE 102015213356 A1 * 1/2017 ........... B60G 21/051
(Continued)

OTHER PUBLICATIONS

Japanese Office Action (Decision to Refusal) for the related Japanese Patent Application No. 2017-001582 dated Dec. 15, 2020.
(Continued)

*Primary Examiner* — Nicole T Verley
(74) *Attorney, Agent, or Firm* — Kenealy Vaidya LLP

(57) ABSTRACT

A motor drive device includes: a trailing arm that extends in a vehicle front-rear direction and includes a vehicle body-side attachment portion and wheel-side support portion, the vehicle body-side attachment portion formed on a forward portion side of the trailing arm and coupled to a vehicle body via a rubber bush, the wheel-side support portion formed on a rear side of the trailing arm and supporting a rear wheel; and a motor that is supported by the trailing arm and drives the rear wheel. The motor and the rubber bush are disposed (Continued)

in such a way that motor and the rubber bush are seen as being substantially aligned in a vehicle up-down direction when viewed in a vehicle width direction.

16 Claims, 11 Drawing Sheets

(56) References Cited

U.S. PATENT DOCUMENTS

| | | | | |
|---|---|---|---|---|
| 9,771,105 | B2* | 9/2017 | Tamura | B60G 21/051 |
| 10,632,808 | B2* | 4/2020 | Holtheide | B60G 21/051 |
| 2001/0025737 | A1 | 10/2001 | Dare-Bryan | |
| 2008/0150249 | A1 | 6/2008 | Murata | |
| 2011/0109052 | A1* | 5/2011 | Hatzikakidis | B60G 11/183 |
| | | | | 280/5.5 |
| 2011/0132673 | A1* | 6/2011 | Kim | B60K 7/0007 |
| | | | | 180/61 |
| 2011/0209961 | A1 | 9/2011 | Yamamoto et al. | |
| 2012/0248850 | A1 | 10/2012 | Hirano | |
| 2012/0298432 | A1* | 11/2012 | Lee | B60K 7/0007 |
| | | | | 180/55 |
| 2014/0000970 | A1 | 1/2014 | Munster et al. | |
| 2014/0345959 | A1 | 11/2014 | Mair et al. | |
| 2019/0283517 | A1* | 9/2019 | Battaglia | B60G 3/20 |

FOREIGN PATENT DOCUMENTS

| | | | | |
|---|---|---|---|---|
| JP | 2005-306090 A | | 11/2005 | |
| JP | 2007-153254 A | | 6/2007 | |
| JP | 2010-121738 A | | 6/2010 | |
| JP | 2011-525876 A | | 9/2011 | |
| JP | 2011230755 A | * | 11/2011 | B60K 6/52 |
| JP | 2012-214202 A | | 11/2012 | |
| JP | 2014-520020 A | | 8/2014 | |
| JP | 2015-223908 A | | 12/2015 | |
| WO | 2012/123175 A1 | | 9/2012 | |
| WO | 2018/131504 A1 | | 7/2018 | |

OTHER PUBLICATIONS

International Search Report and Written Opinion of the International Search Report for PCT/JP2017/047222 dated Mar. 6, 2018.

* cited by examiner

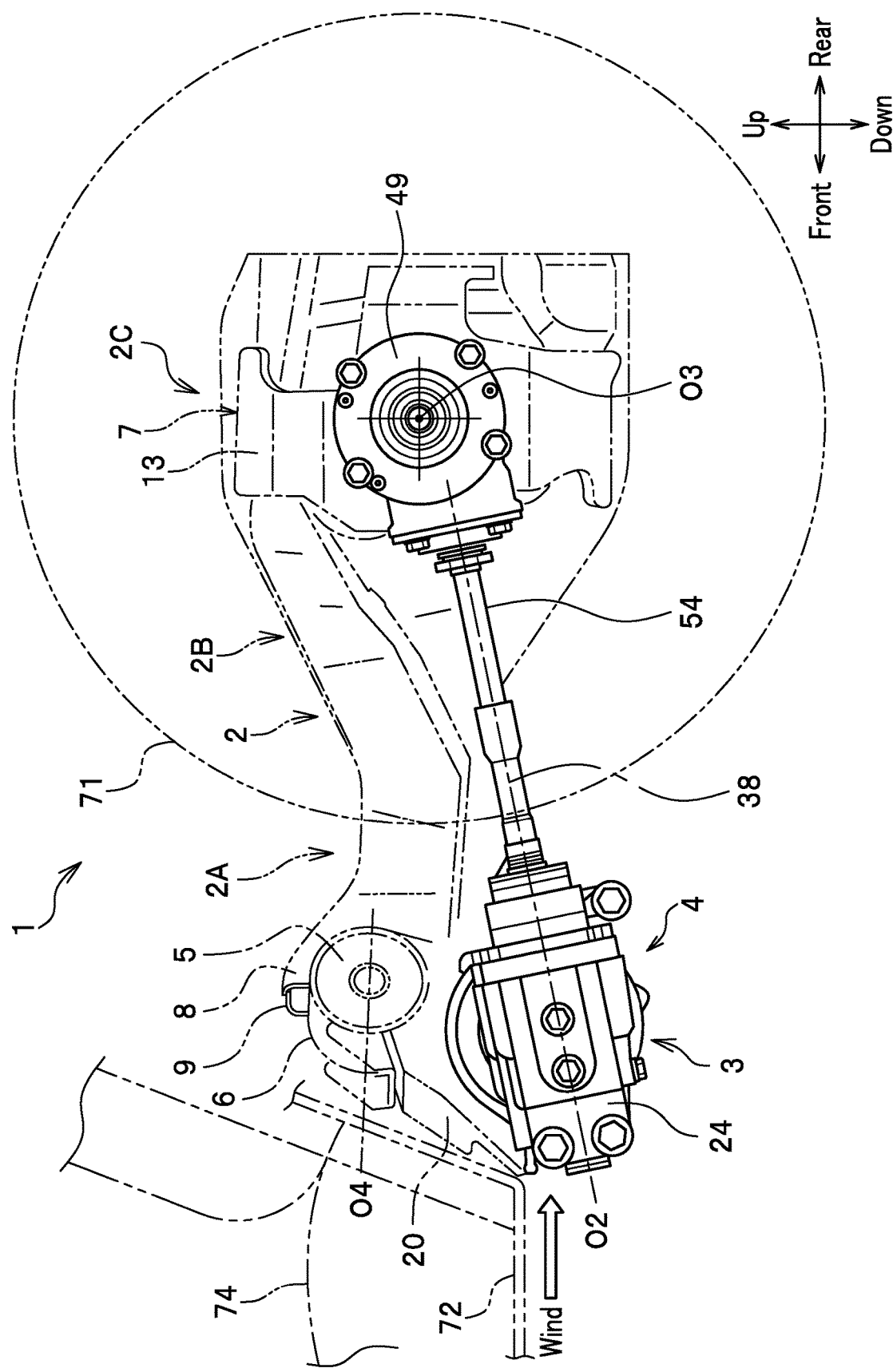

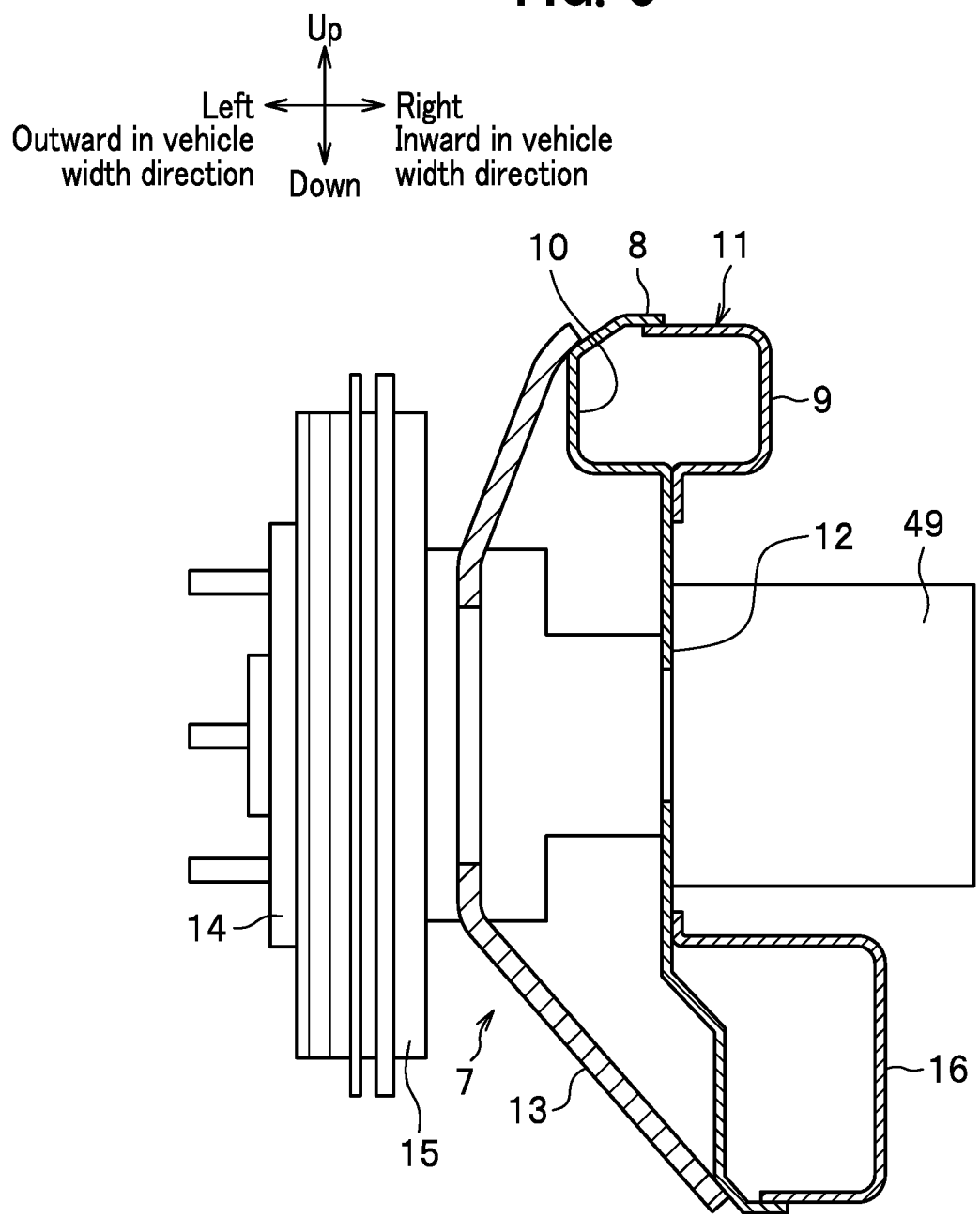

FIG. 9
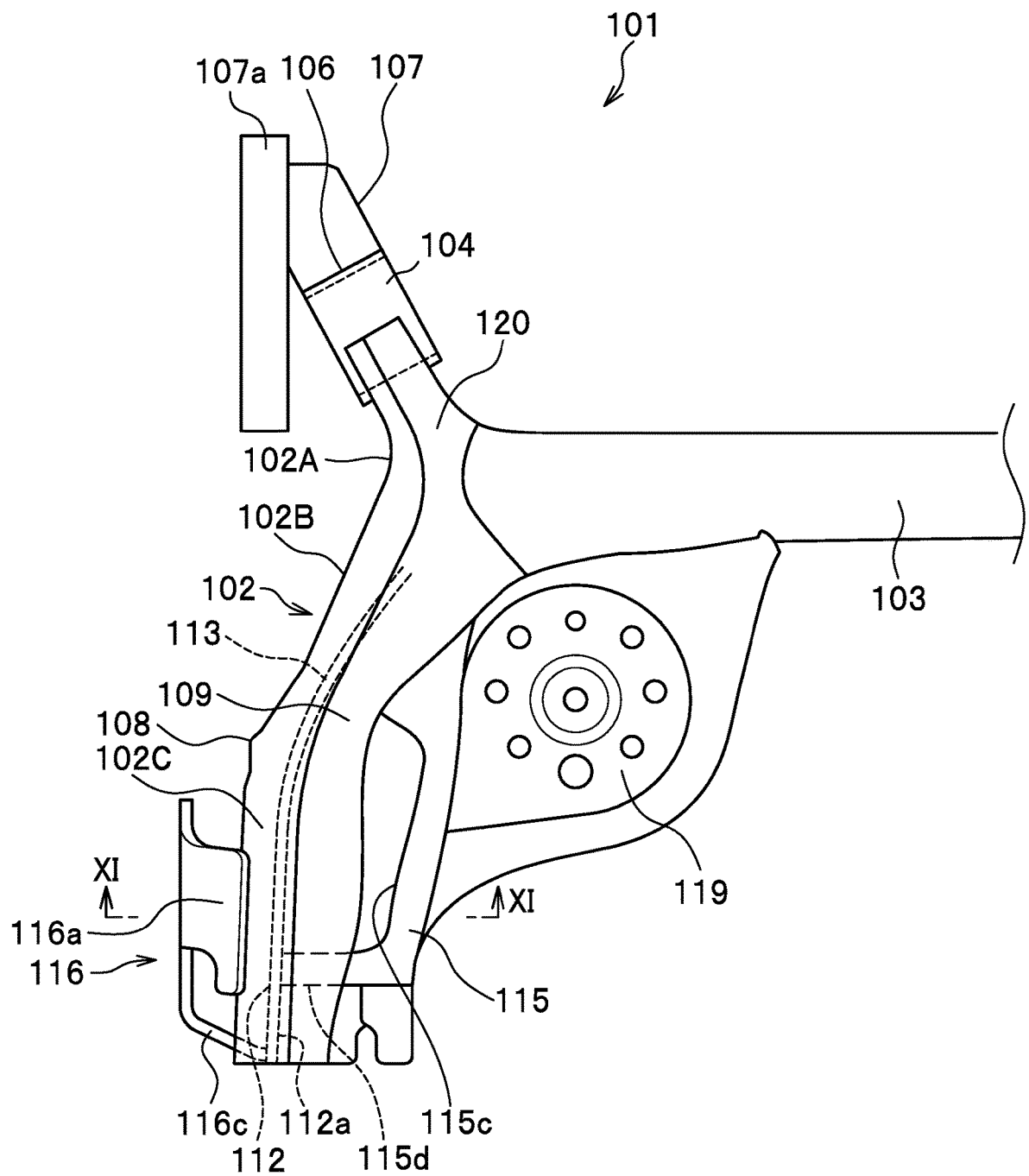
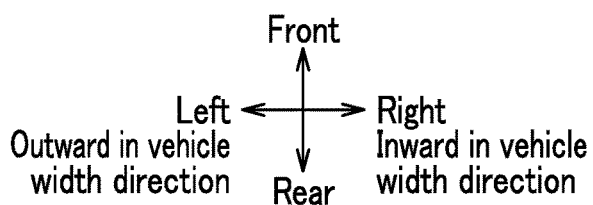

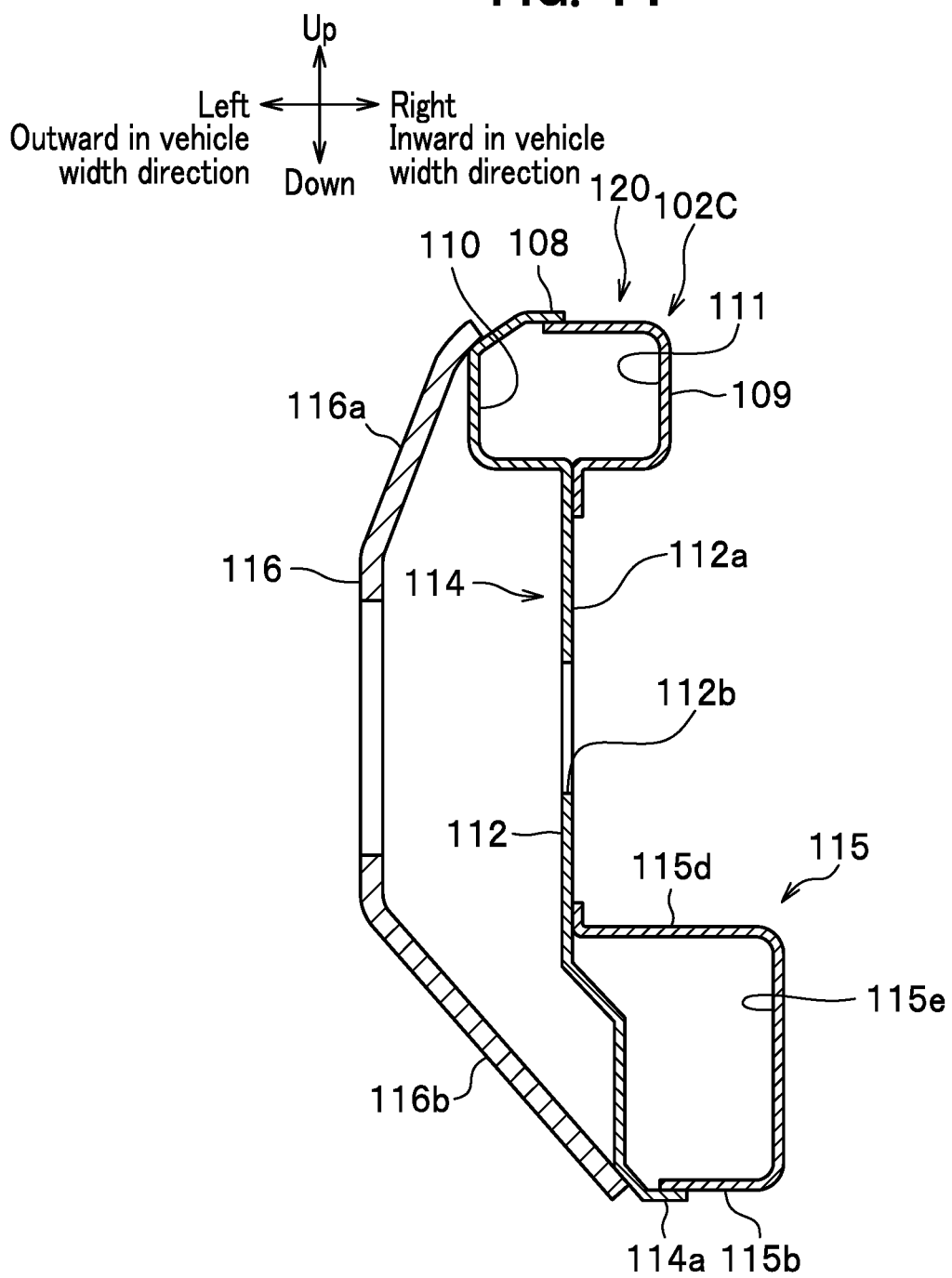

MOTOR DRIVE DEVICE

CROSS-REFERENCE TO RELATED APPLICATION

This application is a U.S. National Stage Application under 35 U.S.C § 371 of International Patent Application No. PCT/JP2017/047222 filed on 28 Dec. 2017, which claims the benefit of priority to Japanese Patent Application No. 2017-001581 filed on 10 Jan. 2017, No. 2017-001582 filed on 10 Jan. 2017 and No. 2017-002096 filed on 10 Jan. 2017 the disclosures of all of which are hereby incorporated by reference in their entireties.

TECHNICAL FIELD

The present invention relates to a motor drive device.

BACKGROUND ART

In the field of hybrid vehicles and electric vehicles and the like which drive wheels with motors, there is known a motor drive device wherein a motor is disposed within the inside of a wheel or in the vicinity of a wheel for the purposes of securing a space for a vehicle compartment.

Patent Literature 1 discloses a motor disposed on a vehicle width direction inner side of a wheel at a position where the motor is overlapped with the wheel when viewed in the vehicle width direction. Patent Literature 2 discloses a motor disposed within the inside of a wheel.

In the field of hybrid vehicles and electric vehicles and the like which drive wheels with motors, there is known a motor drive device wherein a motor rotates a differential drive device of a final reduction gear to drive left and right wheels via the differential device to drive the left and right wheels via a differential drive mechanism. This motor drive device requires that a relatively large final reduction gear having a differential drive mechanism built-in be mounted on the vehicle body, and thus brings a problem related to the layout for securing a mounting place and a problem such that the motor drive device cannot be easily mounted on (attached to) the vehicle.

Patent Literature 3 discloses an example of the motor drive device in which one motor drives one wheel. According to the motor drive device described in Patent Literature 3, the wheels are driven by power of the motor via a gear mechanism, a gearbox housing the gear mechanism is attached to the motor, and the motor is attached to a trailing arm.

On vehicles, a vehicle suspension device that supports wheels with allowing the wheels to move upward and downward is mounted. Examples of such a vehicle suspension device include a trailing suspension device having left-right independent trailing arms and a torsion beam suspension device in which left and right trailing arms are integrally coupled to a beam (torsion beam) extending in the vehicle width direction.

The above-described trailing arm extends in a front-rear direction and has a forward portion swingably coupled to the vehicle body and a plate-like wheel support portion formed on a rear side (see Patent Literature 4). A brake device and a hub are attached on a vehicle width direction outer side of the wheel support portion, and the wheel is attached to the hub. With this structure, the wheel alignment can be adjusted to cause the wheel to toe-in or toe-out by changing an angle of the wheel support portion.

PRIOR ART DOCUMENT

Patent Literature

Patent Literature 1: International Publication No. WO2012/123175
Patent Literature 2: Japanese Patent Laid Open No. 2012-214202
Patent Literature 3: International Publication No. WO2012/123175
Patent Literature 4: Japanese Patent Laid Open No. 2007-153254

SUMMARY OF INVENTION

Problems to be Solved by Invention

In general, a vehicle having a torsion beam suspension structure has rear wheels each attached to a rear end of a trailing arm extending in the vehicle body front-rear direction. The trailing arm has a forward end portion coupled to a vehicle body via an elastic member and the trailing arm swings upward and downward on the elastic member serving as a fulcrum. In this structure, if a motor is disposed within the inside of a rear wheel or is disposed on a vehicle width direction inner side of the rear wheel at a position where the motor is overlapped with the wheel when viewed in the vehicle width direction, the motor is spaced apart rearwardly from the surrounding of the elastic member and thus the unsprung mass is increased and the ride quality may possibly be decreased. In addition, as the motor is disposed in close proximity to the tire or brake, the motor is susceptible to the heat generated from the tire or brake.

Moreover, in a vehicle whose luggage compartment is formed on the laterally inner side of the rear wheels, the motors are disposed between the rear wheels and the luggage compartment. This structure brings a problem such that the space of the luggage compartment is narrowed in the vehicle width direction due to the space allocated for the motor.

According to the technique disclosed in Patent Literature 3, as the gearbox is disposed between the motor attached to the trailing arm and the wheel, a large load due to a twist or the like that occurs between the wheel and the trailing arm is likely to be applied to the gearbox. If the gearbox is deformed due to the load, the deformation may possibly affect the meshing of gears and cause oil leakage.

In order to avoid this problem, it is conceivable to increase the strength of the trailing arm or the gearbox. However, in that case, it may lead to an increase in weight or may affect the original suspension characteristics of the trailing arm.

Recently, considerations have been given to attaching a motor and a gear transmission mechanism to a trailing arm to construct an integrated part, or more in detail, attaching a gearbox to a wheel support portion. However, according to such a structure, when it is necessary to adjust the angle of the output shaft of the gearbox, the adjustment changes not only the orientation of an output shaft but also the angle of the wheel axle (wheel alignment). This may affect the travel performance.

The present invention has been made to solve such problems and an object of the present invention is to provide a motor drive device which is less susceptible to the heat from the wheel and which allows for maintaining the ride quality of the vehicle in a good condition as well as securing a wide space for a luggage compartment located on the laterally inner side of the wheels. Another object of the present invention is to provide a motor drive device which does not affect the suspension characteristics of a trailing arm, while preventing an increase in the weight of a motor and gearboxes to be disposed. Yet another object of the present invention is to provide a motor drive device in which a drive mechanism such as a gearbox can be mounted and a wheel-side support member has a function of adjusting wheel alignment.

Solutions to Problems

To solve the above-described problem, an aspect of the present invention is a motor drive device including: a trailing arm that extends in a vehicle front-rear direction and includes a vehicle body-side attachment portion and a wheel-side support portion, the vehicle body-side attachment portion formed on a front side of the trailing arm and coupled to a vehicle body via an elastic member, the wheel-side support portion formed on a rear side of the trailing arm and supporting a wheel; and a motor that is supported by the trailing arm and drives the wheel, wherein the motor and the elastic member are disposed in such a way that the motor and the elastic member are seen as being substantially aligned in a vehicle up-down direction when viewed in a vehicle width direction.

According to the present invention, the following advantageous effects can be obtained. (1) The trailing arm swings upward and downward on the elastic member serving as a swing fulcrum. Thus, the mass substantially applied to the surrounding of the vehicle body-side attachment portion can be regarded as a sprung mass and the mass applied to a portion extending from the surrounding of the vehicle body-side attachment portion to a rear side of the trailing arm can be regarded as an unsprung mass. As the motor and the elastic member are disposed in such a way that the motor and the elastic member are seen as being substantially aligned in a vehicle up-down direction when viewed in a vehicle width direction, the weight of the motor can be substantially applied to the trailing arm as a sprung mass. With this structure, an increase in the unsprung mass of the trailing arm can be reduced and thus the ride quality of the vehicle can be improved. (2) As the motor is spaced apart forwardly from the wheel, the motor is less susceptible to the heat generated from the wheel.

Another aspect of the present invention is that the trailing arm may further include a motor bracket which extends downward from the vehicle body-side attachment portion and to which the motor is attached.

According to the present invention, the motor can be attached to the trailing arm as a sprung mass with a simple structure.

Another aspect of the present invention is that the motor drive device may further include a gear transmission mechanism that transmits power of the motor to the wheel. The gear transmission mechanism has a gearbox arrangement attached to the trailing arm as a rigid body. The gearbox arrangement includes a first gearbox and a second gearbox arranged separately from each other, the first gearbox housing a first gear unit disposed about a rotating shaft of the motor, the second gearbox spaced apart from the first gearbox and housing a second gear unit disposed about a rotating shaft of the wheel.

As the gearbox arrangement of the gear transmission mechanism is attached to the trailing arm as a rigid body, if a large gearbox is attached as the gearbox arrangement, the suspension characteristics of the trailing arm, such as torsional characteristics, can be influenced by the gearbox arrangement. In contrast, according to the gearbox arrangement having the first gearbox and the second gearbox separately attached to the trailing arm, relatively small sized rigid bodies are attached to the trailing arm as separate units. Therefore, the influence of the gearbox arrangement to the suspension characteristics of the trailing arm can be reduced.

Another aspect of the present invention is that the first gearbox may be attached to the motor bracket.

With this configuration of the first gearbox attached to the motor bracket, the motor bracket can serve as an attachment member to which both the motor and the first gearbox are attached, and thus the motor drive device can be reduced in size.

Another aspect of the present invention is that the trailing arm may include a first gearbox support surface portion formed on the motor bracket and a second gearbox support surface portion spaced apart from the first gearbox support surface portion in the vehicle front-rear direction, the first gearbox is attached to the first gearbox support surface portion, and the second gearbox is attached to the second gearbox support surface portion.

According to the present invention, the first gearbox and the second gearbox can be easily attached to the trailing arm.

Another aspect of the present invention is that the motor may be attached to the motor bracket via the first gearbox.

According to the present invention, the motor and the first gearbox can be collectively disposed. As a result, the motor drive device can be further reduced in size.

Another aspect of the present invention is that the gear transmission mechanism may include a bending mechanism for absorbing a twist that occurs between the first gearbox and the second gearbox due to deformation of the trailing arm.

According to the present invention, the suspension characteristics of the trailing arm can be maintained and the gear transmission function can be less susceptible to the suspension characteristics.

Another aspect of the present invention is that the bending mechanism is a constant velocity joint.

According to the present invention, the bending mechanism can be reduced in size and weight with a simple structure.

Another aspect of the present invention is that the gear transmission mechanism may include: a first transmission shaft extending from the first gearbox; and a second transmission shaft extending from the second gearbox and spline coupled to the first transmission shaft.

According to the present invention, the power transmission path between the first gearbox and the second gearbox can be constructed with a simple structure and the attachment work of the first gearbox and the second gearbox can be simply performed.

Another aspect of the present invention is that a torsion beam extending in a vehicle width direction is attached to the trailing arm, a seat is disposed forwardly of the torsion beam, and the motor is located between the torsion beam and the seat.

the motor can be efficiently disposed in a space between the seat and the torsion beam.

Another aspect of the present invention is that the motor may partially project further than a lower surface of a floor panel of the vehicle body.

According to the present invention, the motor can be efficiently cooled by a wind flowing along the lower surface of the floor panel.

Another aspect of the present invention is that the wheel-side support portion may have a wheel-side support member with a function of adjusting alignment of the wheel, the trailing arm may be made up of an outer member and an inner member disposed opposite to each other in a width direction of the vehicle and together forming a main body portion with a closed cross-sectional shape, the outer member has an intermediate portion that is located intermediate between front and rear ends of the outer member and a widening portion extending rearward from the intermediate portion and widening in an up-down direction of the vehicle, the wheel-side support member has a fixing portion fixed to a width direction outer side of the widening portion, and the widening portion has a mounting portion which is on an inner side in the width direction and on which a drive mechanism is mounted.

According to the present invention, the wheel-side support member has a fixing portion fixed to a width direction outer side of the widening portion, and the widening portion has amounting portion which is on an inner side in the width direction and on which a drive mechanism is mounted. Therefore, while the number of components and thus an increase in the weight is reduced, drive mechanisms such as a gearbox can be mounted. In addition, as the wheel-side support member and the mounting portion are separately configured, the angle of the output shaft of the drive mechanism mounted on the mounting portion can be adjusted without affecting the wheel alignment.

Another aspect of the present invention is that the trailing arm may further include a reinforcing member bonded to the inner member and extending on a rear end side, wherein the inner member and the reinforcing member are disposed such that a rearward portion of the inner member and a rearward portion of the reinforcing member are spaced apart from each other in the up-down direction, and the mounting portion is located between the inner member and the reinforcing member.

According to the present invention, the mounting portion is located between the inner member and the reinforcing member. Thus, the inner member or the reinforcing member covers the lower side of the drive mechanism mounted on the mounting portion and therefore protects the drive mechanism from being collided with chipping. In addition, vertical opposite sides of the mounting portion are supported and thus the strength and rigidity of the mounting portion is further improved.

Another aspect of the present invention is that the fixing portion may include an upper fixing portion and a lower fixing portion spaced apart from each other in the up-down direction, wherein the mounting portion is located between the upper fixing portion and the lower fixing portion.

According to the present invention, the upper fixing portion and the lower fixing portion spaced apart from each other in the up-down direction support the vertical opposite sides of the wheel-side support member. The wheel-side support member is not likely to collapse due to an input from the wheel side.

Another aspect of the present invention is that the widening portion may include a forward wall portion that covers a front side of the drive mechanism mounted on the mounting portion, wherein the forward wall portion has an opening that opens in the front-rear direction.

According to the present invention, the forward wall portion has an opening that opens in the front-rear direction. While maintaining the strength and rigidity of the trailing arm, this structure allows a transmission shaft, such as a drive shaft that transmits power to the drive mechanism, to pass through the opening, and protects the drive mechanism from chipping.

Another aspect of the present invention is that the motor drive device may further include a spring seat that is fixed to the trailing arm and supports a lower end side of a suspension spring, wherein the inner member is disposed on an upper side relative to the mounting portion, the reinforcing member is disposed on an lower side relative to the mounting portion, and the spring seat is fixed to the reinforcing member.

According to the present invention, the spring seat is fixed to the reinforcing member. This structure improves the support rigidity of the suspension spring while reducing unnecessary increase in the weight.

Advantageous Effects of Invention

The present invention can provide a motor drive device which allows for maintaining the ride quality of the vehicle in a good condition and which is less susceptible to the heat from the wheel as well as securing a wide space for a luggage compartment located on the laterally inner sides of the wheels. The present invention can provide a gearbox arrangement structure which prevents an increase in the weight and does not affect the suspension characteristics of the trailing arm. The present invention can provide a motor drive device in which a drive mechanism made up of a gearbox, a motor and the like can be mounted and which allows for adjusting wheel alignment.

BRIEF DESCRIPTION OF THE DRAWINGS

FIG. 3 is a side view of a gear transmission mechanism.

FIG. 5 is a cross-sectional view taken along line V-V in FIG. 2.

FIG. 9 is an enlarged plan view of the trailing arm shown in FIG. 8, wherein a motor and the gear transmission mechanism and the like have been detached from the trailing arm.

FIG. 11 is a cross-sectional view taken along line Xi-XI in FIG. 9.

EMBODIMENTS OF INVENTION

First Embodiment

Figure 1:
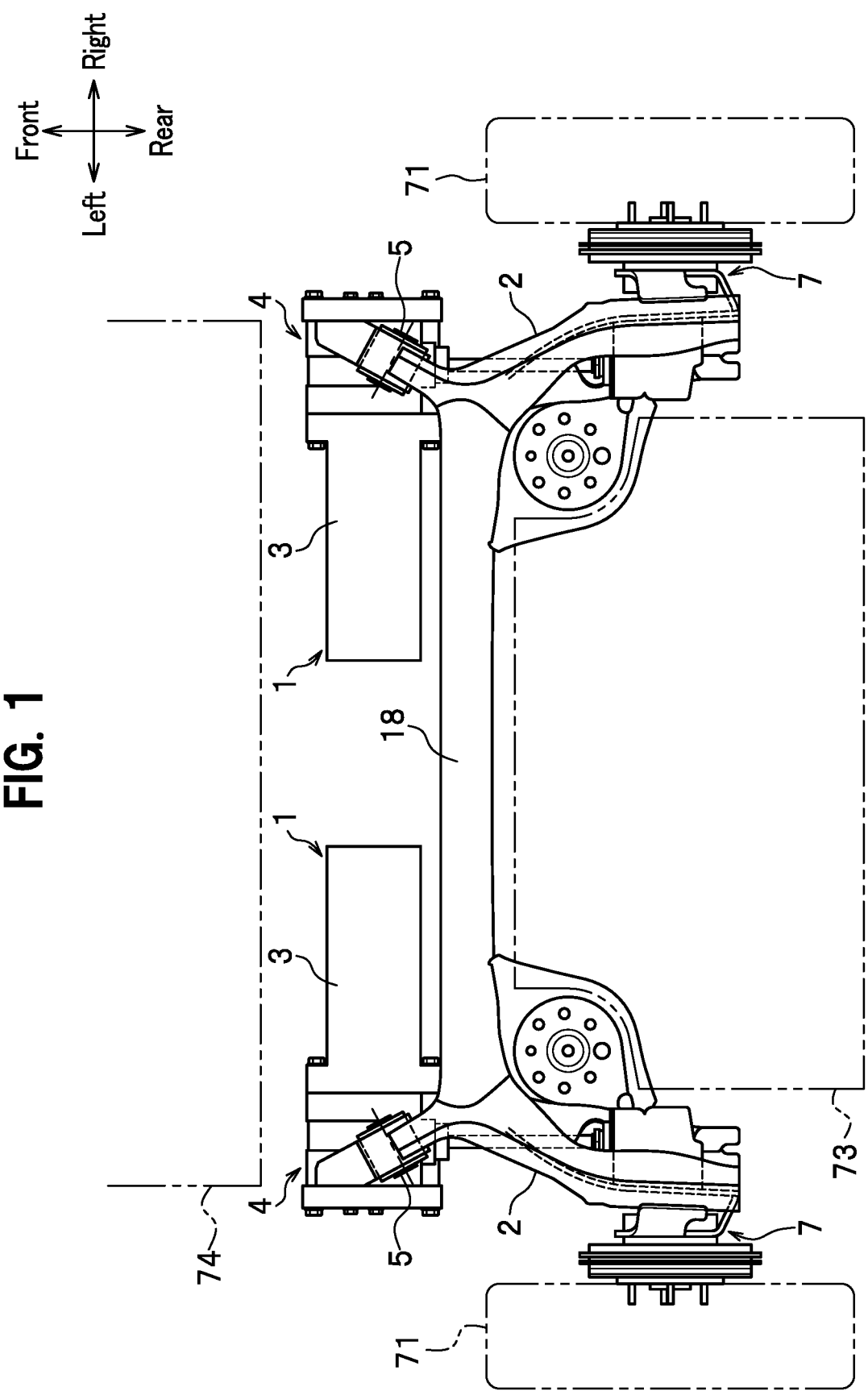
FIG. 1 is a plan view of a motor drive device of the present invention.

Referring to FIG. 1, a motor drive device 1 of the present embodiment has trailing arms 2, motors 3 supported by the trailing arms 2 and configured to drive rear wheels 71, gear transmission mechanisms 4 that transmit power of the motors 3 to the rear wheels 71. Hereinafter, a description will be given of the motor drive device 1 that drives the rear wheel 71 on the vehicle left side. The structure of the motor drive device 1 that drives the rear wheel 71 on the vehicle right side is the same except that the layout of the devices are left-right symmetric to each other.

Trailing Arm 2

Referring to FIGS. 2 to 4B, the trailing arm 2 is disposed to extend substantially in the vehicle front-rear direction. The trailing arm 2 includes: a vehicle body-side attachment portion 6 formed on a front side of the trailing arm 2 to be coupled to a vehicle body not shown via rubber bush (elastic member) 5; and a wheel-side support portion 7 formed on a rear side of the trailing arm 2 to support the rear wheel 71. The vehicle body-side attachment portion 6 is formed of a circular cylindrical collar member which opens at opposite ends thereof and whose axis is oriented in a substantially horizontal direction. A columnar rubber bush 5 is attached to the inside of the vehicle body-side attachment portion 6 by press-fitting or the like and is coupled to a vehicle body via a not-shown bolt. The trailing arm 2 swings upward and downward on a swing shaft corresponding to an axial center O4 of the rubber bush 5.

The trailing arm 2 includes an outer member 8 disposed on a vehicle width direction outer side and an inner member 9 disposed on a vehicle width direction inner side. The outer member 8 and the inner member 9 each have a front end attached to the vehicle body-side attachment portion 6 by welding or the like. As shown in FIG. 5, the inner member 9 has a substantially U-shaped cross-sectional shape to have an opening that opens outward in the vehicle width direction. The outer member 8 has a U-shaped portion 10 having an opening that opens inward in the vehicle width direction. As shown in FIG. 4B, the trailing arm 2 includes: a forward horizontal portion 2A that extends rearward and substantially horizontally from the vehicle body-side attachment portion 6, an intermediate portion 2B with a vertical width that increases as it extends rearward from a rear end of the forward horizontal portion 2A, and a rearward horizontal portion 2C that extends rearward and substantially horizontally from a rear end of the intermediate portion 2B. An end portion of the U-shaped portion 10 of the outer member 8 and an end portion of the inner member 9 are welded to each other to form a main body portion 11 having a closed cross-sectional shape as shown in FIG. 5. Thus, the main body portion 11 has the closed cross-sectional shape throughout the forward horizontal portion 2a, the intermediate portion 2B, and the rearward horizontal portion 2C, and thus the trailing arm 2 has high strength and rigidity. As shown in FIG. 4B, the outer member 8 has a transmission shaft through-hole 8A for allowing a later-described second transmission shaft 54 to pass through.

Figure 2:
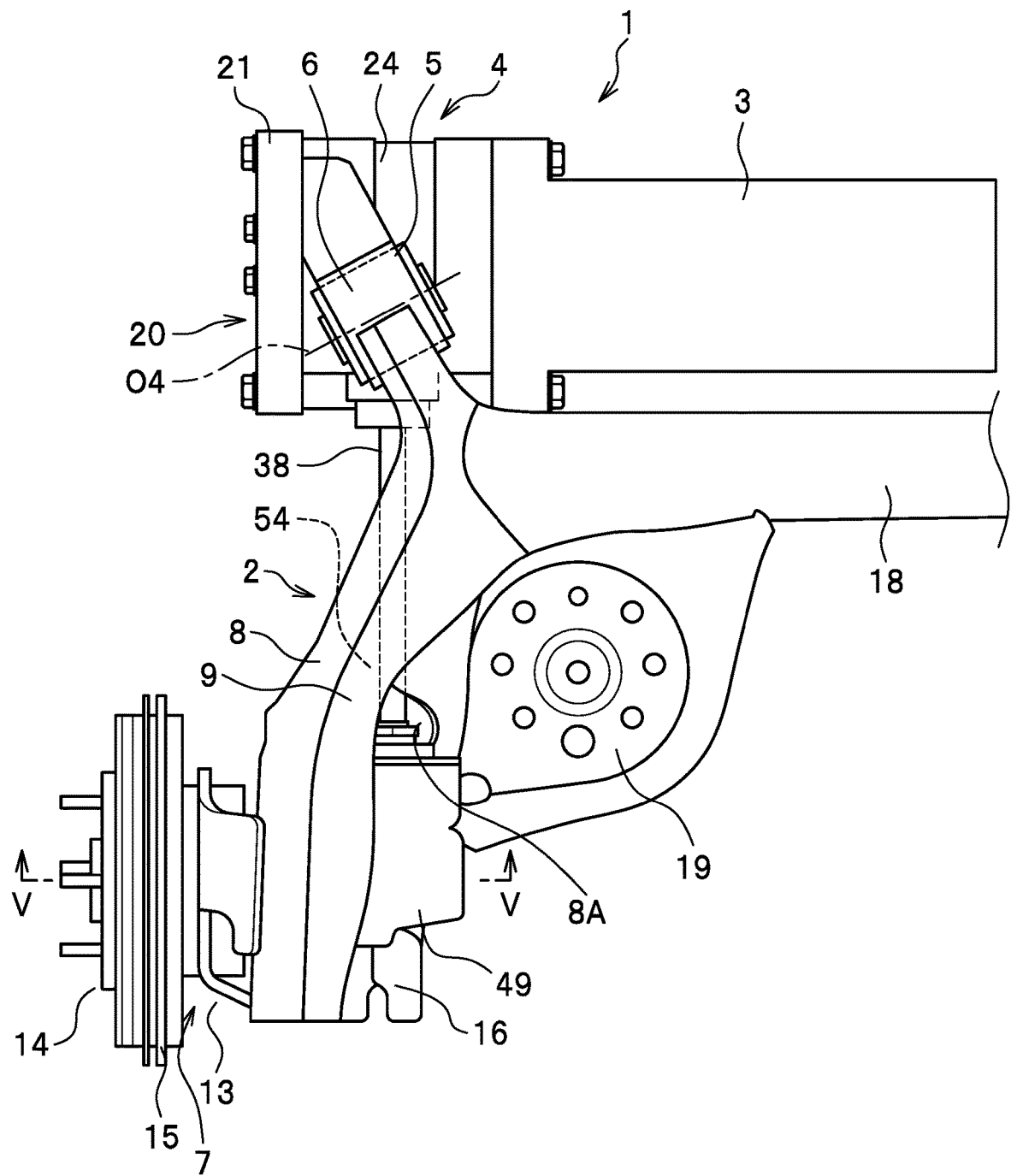
FIG. 2 is an enlarged plan view of the motor drive device of the present invention.
Figure 4A:
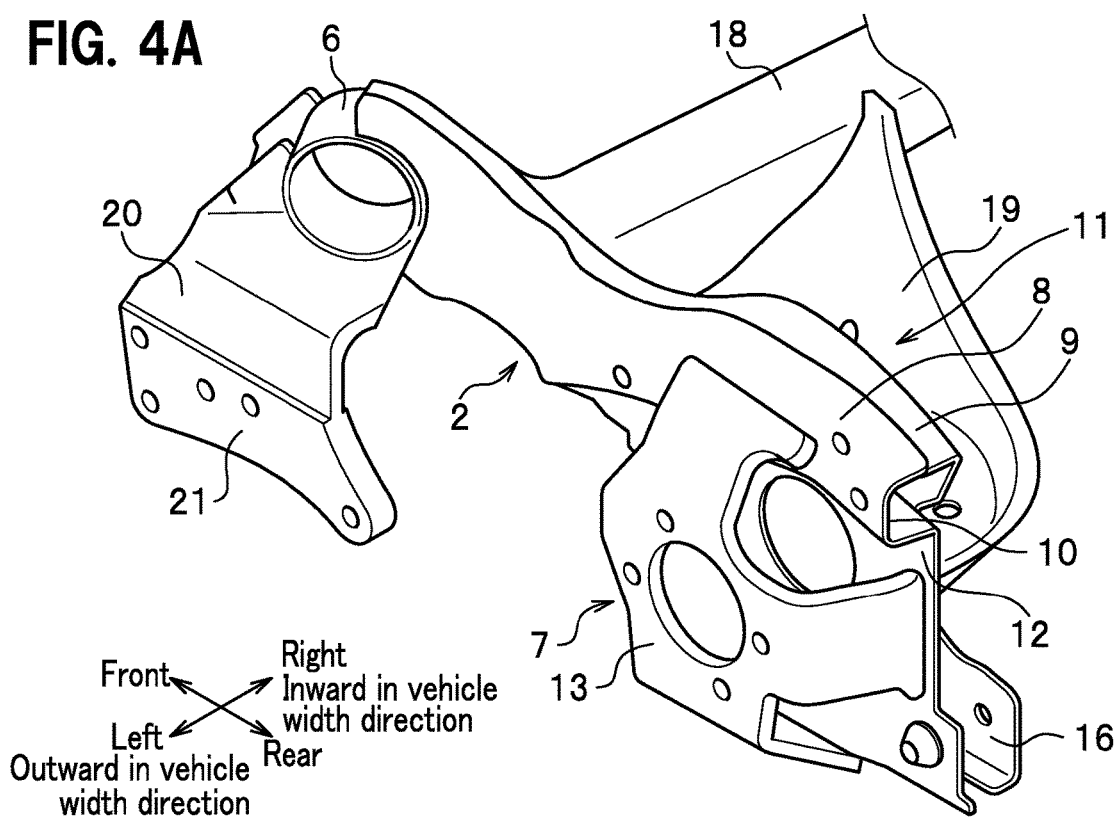
FIG. 4A is an external perspective view of a trailing arm as viewed from rear on an outer side in a vehicle width direction.
Figure 4B:
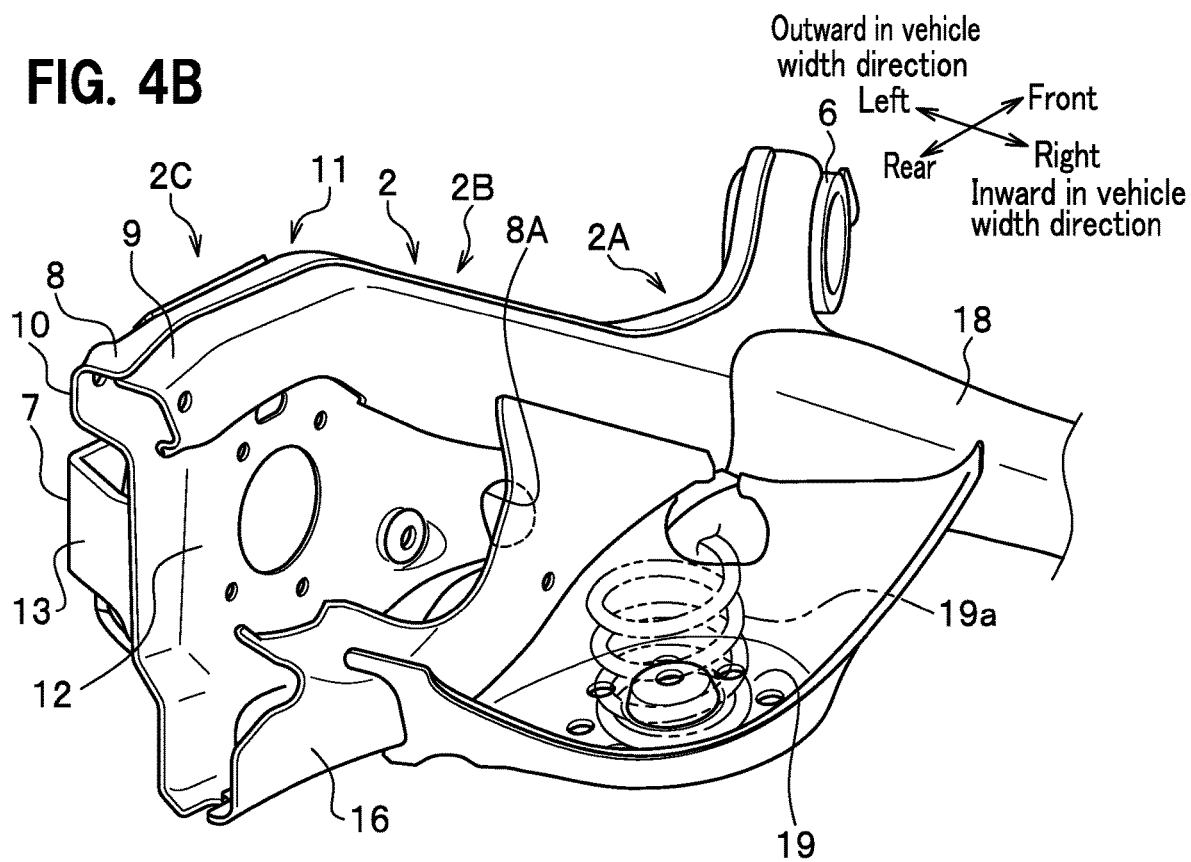
FIG. 4B is an external perspective view of the trailing arm as viewed from rear on an inner side in a vehicle width direction.

As shown in FIGS. 4A and 4B, the rearward horizontal portion 2C of the outer member 8 has a second gearbox support surface portion 12 extending vertically downward from a lower end of the main body portion 11. The second gearbox support surface portion 12 has a vehicle width direction outer side surface to which a wheel-side support member 13 serving as the above-described wheel-side support portion 7 is attached. As shown in FIG. 2, a hub 14 to which the rear wheel 71 is attached and a brake device 15 are attached to the wheel-side support member 13.

Referring to FIG. 4B, a reinforcing member 16 is attached to and between a vehicle width direction inner side surface of the intermediate portion 2B of the inner member 9 and a vehicle width direction inner side surface of the second gearbox support surface portion 12. The second gearbox support surface portion 12 and the reinforcing member 16 together define a closed cross-sectional portion as shown in FIG. 5. Referring to FIG. 4, the forward horizontal portion 2A of the inner member 9 has a vehicle width direction inner side surface to which a torsion beam 18 extending in the vehicle width direction is attached. The torsion beam 18 couples between the left and right trailing arms 2. A spring seat 19 for placing a suspension spring 19a is attached to and between the reinforcing member 16 and the torsion beam 18. As shown in FIG. 1, a luggage compartment 73 of the vehicle is located on the rear side of the torsion beam 18 and between the left and right rear wheels 71.

Referring to FIGS. 4A and 4B, a motor bracket 20 extending downward and configured to attach the motor 3 is integrally formed with a lower portion of the vehicle body-side attachment portion 6. The motor bracket 20 has a first gearbox support surface portion 21 with a vertical surface extending in the vehicle front-rear direction.

Gear Transmission Mechanism 4

Figure 6:
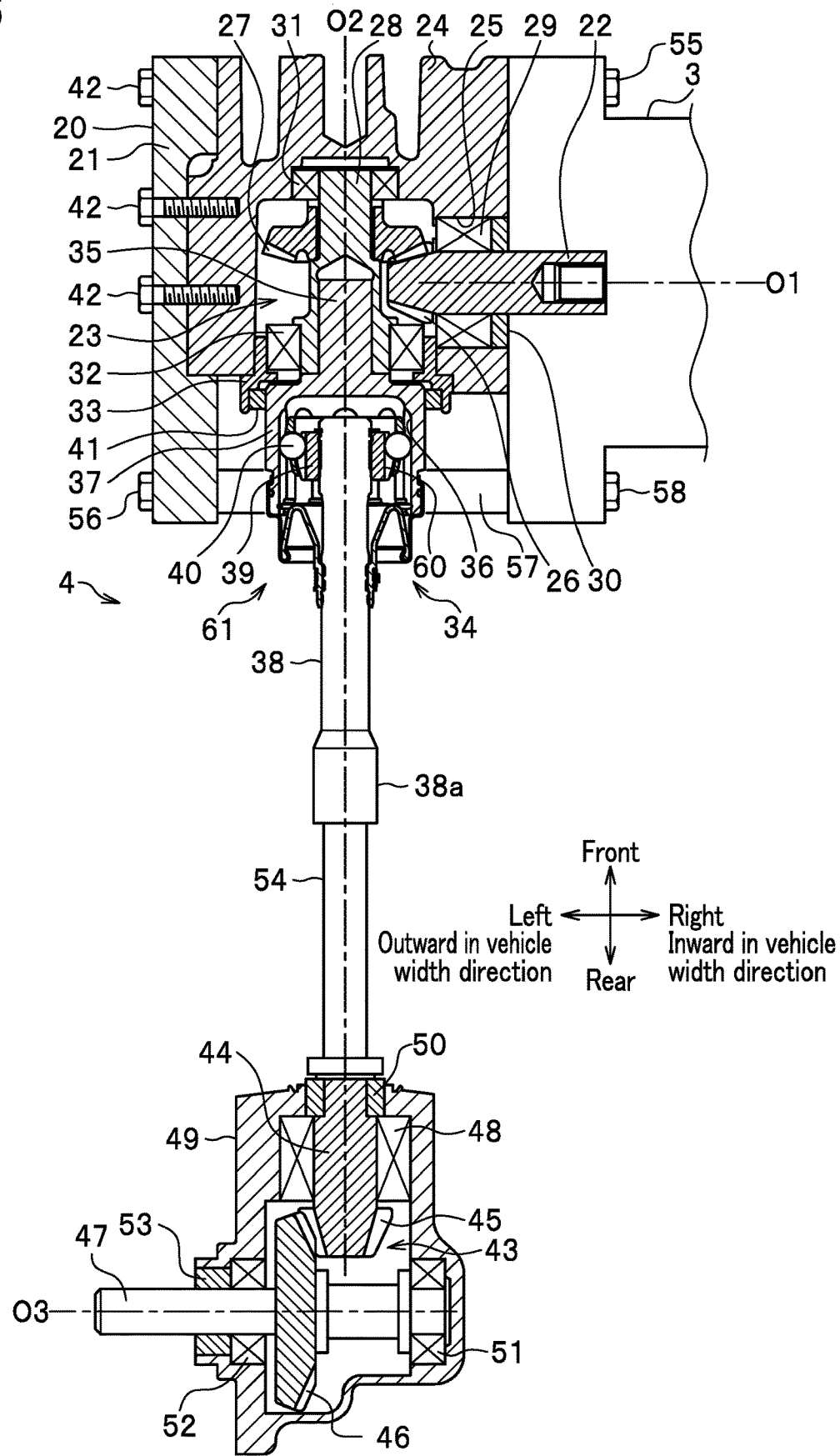
FIG. 6 is a plan sectional view of the gear transmission mechanism.

Referring to FIG. 6, the gear transmission mechanism 4 has a first gearbox 24 and a second gearbox 49 which are separately arranged and rigidly attached to the trailing arm 2. The first gearbox 24 houses a first gear unit 23 disposed about a rotating shaft 22 of the motor 3. The second gearbox 49 houses a second gear unit 43 disposed about a rotating shaft 47 of the rear wheel 71.

The first gearbox 24 has a rear side on which an opening is formed and has a vehicle width direction inner side on which a through-hole 25 through which the rotating shaft 22 is passed is formed. The first gear unit 23 has: a rotating shaft 22 that is integrally rotatably coupled to the output shaft of the motor 3 and is rotatable about an axial center O1 extending in the vehicle width direction; a first bevel gear 26 formed on a left end of the rotating shaft 22; a second bevel gear 27 arranged substantially orthogonal to and engaging with the first bevel gear 26; and a spindle 28 that supports the second bevel gear 27 and is rotatable about an axial center O2 extending rearward and inclining slightly upward and substantially along the vehicle front-rear direction.

The rotating shaft 22 is supported in the through-hole 25 via a bearing 29.

A sealing member 30 is interposed between the rotating shaft 22 and the first gearbox 24. The spindle 28 has a front end supported by the first gearbox 24 via a bearing 31 and has a rear end supported by a cover 33 via a bearing 32. The cover 33 is fitted into the rear opening of the first gearbox 24. The cover 33 has a central portion in which an opening for allowing a constant velocity joint 34 to pass through is formed.

The gear transmission mechanism 4 includes a bending mechanism 61 for absorbing a twist that occurs between the first gearbox 24 and the second gearbox 49 due to deformation of the trailing arm 2. In the present embodiment, the bending mechanism 61 is constituted by the constant velocity joint 34. The constant velocity joint 34 has: a coupling shaft 35 that is integrally rotatably coupled to a rear end surface of the spindle 28 by spline coupling or the like; an outer ring member 37 formed on a rear end of the coupling shaft 35 and having an inner circumferential surface on which a plurality of roll grooves 36 extending along the axial center O2 are formed; a first transmission shaft 38 disposed so as to be on the axial center O2; an inner ring member 39 out-fitted on a front end of the first transmission shaft 38; a plurality of roll grooves 60 formed on an outer peripheral surface side of the inner ring member 39; a plurality of balls 40 which is allowed to roll between the roll grooves 36 and the roll grooves 60. A sealing member 41 is interposed between the outer ring member 37 and the cover 33. As the balls 40 roll between the roll grooves 36 and the roll grooves 60, the first transmission shaft 38 is allowed to move in the direction of the axial center O2 with making an angle with the outer ring member 37. With this structure, even when a lateral force is applied to the rear wheel 71 to cause a twist in the trailing arm 2 and thus a twist between the first gearbox 24 and the second gearbox 49, the constant velocity joint 34 transmits power to the rear wheel 71 while absorbing the twist without causing variations in the revolutions.

The first gearbox 24 is fastened and fixed to the first gearbox support surface portion 21 with a plurality of bolts 42 from the vehicle width direction outer side, with a vehicle width direction outer side surface of the first gearbox 24 being put on the vehicle width direction inner side surface of the first gearbox support surface portion 21.

The second gear unit 43 has: a spindle 44 that is rotatable about the axial center O2; a third bevel gear 45 formed on a rear end of the spindle 44; a fourth bevel gear 46 arranged substantially perpendicular to and engaging with the third bevel gear 45; and a rotating shaft 47 that supports the fourth bevel gear 46 and is rotatable about an axial center O3 extending in the vehicle width direction. The third bevel gear 45 and the fourth bevel gear 46 mesh with each other such that the reaction force due to the gear meshing operates as a downward force when the gears rotate in a direction for advancing the vehicle. This configuration improves the contact of the rear wheel 71 to the ground.

The spindle 44 is supported by the second gearbox 49 via a bearing 48. A sealing member 50 is interposed between the spindle 44 and the second gearbox 49. The rotating shaft 47 has a right end supported by the second gearbox 49 via a bearing 51 and has a portion located on the left end side and supported by the second gearbox 49 via a bearing 52. A sealing member 53 is interposed between the rotating shaft 47 and the second gearbox 49. The spindle 44 has a front end integrally rotatably coupled to the second transmission shaft 54 extending forward. The second transmission shaft 54 has a front end integrally rotatably coupled to a rear end of the first transmission shaft 38 by spline coupling or the like. The first transmission shaft 38 is located below the forward horizontal portion 2A of the trailing arm 2.

The second transmission shaft 54 extends through the transmission shaft through-hole 8A of the outer member 8 and extends further on the vehicle width direction inner side relative to the outer member 8.

The second gearbox 49 is fastened and fixed to the second gearbox support surface portion 12 with a plurality of bolts not shown from the vehicle width direction outer side, with a vehicle width direction outer side surface of the second gearbox 49 being put on the vehicle width direction inner side surface of the second gearbox support surface portion 12.

Motor 3

The motor 3 is for example a three-phase alternating current motor and is connected to a battery via an inverter (not shown). The motor 3 is fastened and fixed to a vehicle width direction inner side surface of the first gearbox 24 with bolts 55 from the vehicle width direction inner side, with the vehicle width direction outer side surface of the motor 3 being put on the vehicle width direction inner side surface of the first gearbox 24. Incidentally, a collar 57 is fastened and fixed to a portion of the first gearbox support surface portion 21 with a bolt 56. The motor 3 is fastened and fixed also to this collar 57 with a bolt 58.

As described above, according to the present embodiment, the motor 3 is attached to the first gearbox support surface portion 21 via the first gearbox 24, i.e., to the motor bracket 20. The motor 3 has a substantially circular cylindrical shape and has a longitudinal length along the vehicle width direction. As shown in FIG. 3, the motor 3 is disposed in such a way that the motor 3 and the rubber bush 5 are seen as being substantially aligned in the vehicle up-down direction when viewed in the vehicle width direction. Herein, "seen as being substantially aligned" means that at least a portion of the motor 3 and the rubber bush 5 are seen as being aligned in the vehicle up-down direction. As shown in FIG. 1, a seat 74 is disposed on the front side relative to the torsion beam 18 (see also FIG. 3). The motor 3 is disposed between the seat 74 and the torsion beam 18 with respect to the vehicle front-rear direction. As shown in FIG. 3, the motor 3 is disposed such that the motor 3 partially projects downward further than a lower surface of a floor panel 72 of the vehicle body.

Procedure of Attaching the Motor Drive Device 1

An example of procedure of attaching the motor drive device 1 will be described. First, at a stage before attaching the trailing arm 2 to the vehicle body, the gear transmission mechanism 4 is attached to the trailing arm 2 by attaching the first gearbox 24 and the second gearbox 49 to the trailing arm 2 so that the first transmission shaft 38 and the second transmission shaft 54 are respectively spline coupled to each other. Next, the trailing arm 2 is lifted to a higher position relative to the vehicle body and then attached to the vehicle body via the rubber bush 5. Then, the motor 3 is attached to the first gearbox 24.

With the above-described attachment procedure, by attaching the gear transmission mechanism 4 to the trailing arm 2 at a stage before attaching the trailing arm 2 to the vehicle body, a large work space for the attachment work can be secured and thus the work efficiency is improved. In contract, as the motor 3 is relatively heavy, when the motors 3 are together attached, the trailing arms 2 and the torsion beam 18 are bent due to the weight of the motors 3 when lifting the trailing arms 2, thus making it difficult to put the rubber bushes 5 on attachment portions of the vehicle body. In contrast, by attaching the trailing arms 2 to the vehicle body and then attaching the motors 3 to the trailing arms 2 via the first gearboxes 24, a decrease in the workability of attaching the trailing arms 2 to the vehicle body can be prevented.

Operations and Advantageous Effect

A structure includes: a trailing arm 2 that extends in a vehicle front-rear direction and includes a vehicle body-side attachment portion 6 and wheel-side support portion 7, the vehicle body-side attachment portion 6 formed on a forward portion side of the trailing arm 2 and coupled to a vehicle body via a rubber bush 5, the wheel-side support portion 7 formed on a rear side of the trailing arm 2 and supporting a rear wheel 71; and a motor 3 that is supported by the trailing arm 2 and drives the rear wheel 71, wherein the motor 3 and the rubber bush 5 are disposed in such a way that the motor 3 and the rubber bush 5 are seen as being substantially aligned in a vehicle up-down direction when viewed in a vehicle width direction. With this configuration, the following operations and advantageous effects can be obtained.

(1) The trailing arm 2 swings upward and downward on the rubber bush 5 serving as a fulcrum and a spring. Thus, the mass substantially applied to the surrounding of the vehicle body-side attachment portion 6 can be regarded as a sprung mass and the mass applied to a portion from the surrounding of the vehicle body-side attachment portion 6 to a rear side of the trailing arm 2 can be regarded as an unsprung mass. According to the present invention, as the motor 3 and the rubber bush 5 are disposed in such a way that the motor 3 and the rubber bush 5 are seen as being substantially aligned in a vehicle up-down direction when viewed in a vehicle width direction, the weight of the motor 3 can be substantially applied to the trailing arm 2 as a sprung mass. With this structure, an increase in the unsprung mass of the trailing arm 2 can be reduced and thus the ride quality of the vehicle can be improved. (2) As the motor 3 is spaced apart forwardly from the rear wheel 71 and the brake device 15, the motor 3 is less susceptible to the heat generated from the rear wheel 71. (3) As the motor 3 is spaced apart forwardly from the rear wheel 71, a luggage compartment 73 located laterally inward with respect to the rear wheel 71 can be configured to have a wide space in the vehicle width direction.

The trailing arm 2 may have a motor bracket 20 which extends downward from the vehicle body-side attachment portion 6 and to which the motor 3 is attached. With this configuration, the motor 3 can be attached to the trailing arm 2 as a sprung mass with a simple structure.

The above-described structure may further have a gear transmission mechanism 4 that transmits power of the motor 3 to the rear wheel 71. The gear transmission mechanism 4 has a gearbox arrangement rigidly attached to the trailing arm 2. The gearbox arrangement has a first gearbox 24 and a second gearbox 49 arranged separately from each other. The first gearbox 24 houses a first gear unit 23 disposed about a rotating shaft 22 of the motor 3. The second gearbox 49 is spaced apart from the first gearbox 24 and houses a second gear unit 43 disposed about a rotating shaft 47 of the rear wheel 71. With this configuration, the following operations and advantageous effects can be obtained.

As the gearbox arrangement of the gear transmission mechanism 4 is attached to the trailing arm 2 as a rigid body, if a large gearbox is attached as the gearbox arrangement, the suspension characteristics of the trailing arm 2, such as torsional characteristics, can be influenced by the gearbox arrangement. In contrast, according to the gearbox arrangement having the first gearbox 24 and the second gearbox 49 separately attached to the trailing arm 2, relatively small sized rigid bodies are attached to the trailing arm 2 as separate units. Therefore, the influence of the gearbox arrangement to the suspension characteristics of the trailing arm 2 can be reduced.

The first gearbox 24 may be attached to the motor bracket 20. With this configuration, the motor bracket 20 can serve as an attachment member to which both the motor 3 and the first gearbox 24 are attached, and thus the motor drive device 1 can be reduced in size.

The trailing arm 2 may further include a first gearbox support surface portion 21 formed on the motor bracket 20 and a second gearbox support surface portion 12 spaced apart from the first gearbox support surface portion 21 in the vehicle front-rear direction, wherein the first gearbox 24 is attached to the first gearbox support surface portion 21, and the second gearbox 49 is attached to the second gearbox support surface portion 12. With this configuration, the first gearbox 24 and the second gearbox 49 can be easily attached to the trailing arm 2.

The motor 3 may be attached to the motor bracket 20 via the first gearbox 24. With this structure, the motor 3 and the first gearbox 24 can be collectively disposed. As a result, the motor drive device 1 can be further reduced in size.

The gear transmission mechanism 4 may include a bending mechanism 61 for absorbing a twist that occurs between the first gearbox 24 and the second gearbox 49 due to deformation of the trailing arm 2. With this configuration, the suspension characteristics of the trailing arm 2 can be maintained and the gear transmission function can be less susceptible to the suspension characteristics.

The bending mechanism 61 may be a constant velocity joint 34. With this configuration, the bending mechanism 61 can be reduced in size and weight with a simple structure.

The gear transmission mechanism 4 may have: a first transmission shaft 38 extending from the first gearbox 24; and a second transmission shaft 54 extending from the second gearbox 49 and spline coupled to the first transmission shaft 38 at 38a. With this configuration, the power transmission path between the first gearbox 24 and the second gearbox 49 can be constructed with a simple structure and the attachment work of the first gearbox 24 and the second gearbox 49 can be simply performed.

In the above-described structure, a torsion beam 18 extending in the vehicle width direction may be attached to the trailing arm 2, a seat 74 may be disposed forwardly of the torsion beam 18, and the motor 3 may be located between the torsion beam 18 and the seat 74. With this configuration, the motor 3 can be efficiently disposed in a space between the seat 74 and the torsion beam 18.

The motor 3 may partially project downward further than a lower surface of a floor panel 72 of the vehicle body. With this configuration, the motor 3 can be efficiently cooled by a wind flowing along the lower surface of the floor panel 72.

A preferred embodiment of the present invention has been described above. In the described embodiment, the first gearbox 24 is attached to one side of the motor bracket 20 and the motor 3 is attached to the first gearbox 24. However, this structure may be modified such that the first gearbox 24 is attached to one side of the motor bracket 20 and the motor 3 is attached to the other side of the motor bracket 20. Moreover, a bracket for attaching the first gearbox 24 and a bracket for attaching the motor 3 may be separately formed.

The gear transmission mechanism 4 may adopt spur gears in place of the bevel gears. The twist absorbing mechanism 61 may adopt spherical spline or the like in place of the constant velocity joint.

Second Embodiment

Figure 7:
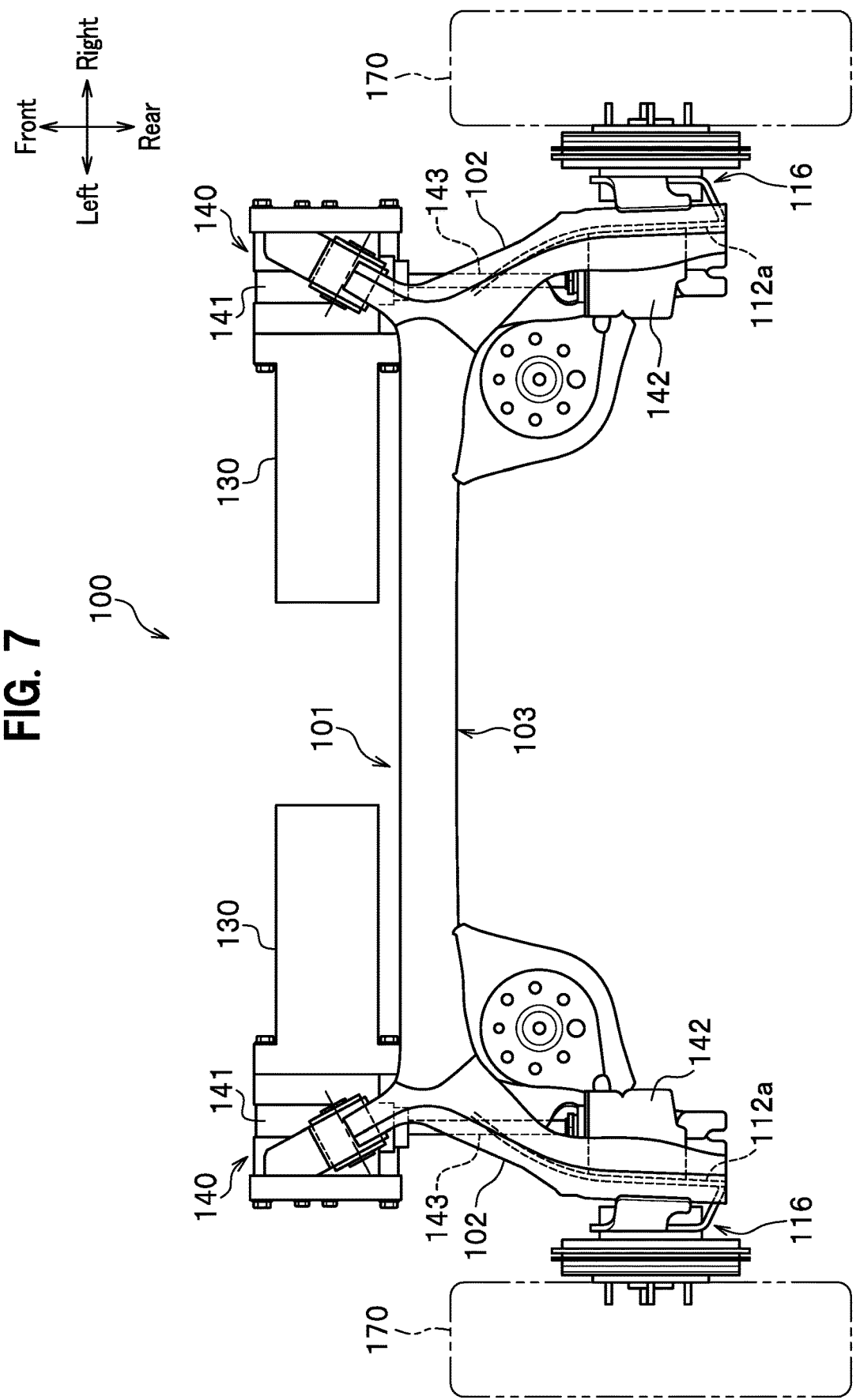
FIG. 7 is a plan view of a motor drive device of a second embodiment as viewed from the above.

Hereinafter, a description will be given of a second embodiment with reference to the drawings. As shown in FIG. 7, a rear wheel drive device 100, which is a motor drive device, has: a vehicle suspension device 101 that supports left and right rear wheels 170, 170 by left and right trailing arms 102, 102 spaced apart from each other; left and right motors 130, 130 supported by the vehicle suspension device 101; and left and right gear transmission mechanisms 140, 140 supported by the vehicle suspension device 101.

The gear transmission mechanisms 140 transmit rotational movement of output shafts (not shown) of the motors 130 to the rear wheels 170. Each of the gear transmission mechanisms 140 has a first gearbox 141 disposed on a front side of the gear transmission mechanism 140, a second gearbox 142 disposed on a rear side of the gear transmission mechanism 140, and a transmission shaft 143 that transmits a driving force from the first gearbox 141 to the second gearbox 142.

The vehicle suspension device 101 is a torsion beam suspension and has the left and right trailing arms 102, 102 disposed opposite to each other in the vehicle width direction and a torsion beam 103 extending in the vehicle width direction and having opposite ends bonded to the left and right trailing arms 102, 102. Incidentally, the trailing arms 102 and the torsion beam 103 according to the present embodiment are made of a metal material. However, they may be, for example, formed of a resin material or the like. The materials for them are not particularly limited.

Figure 8:
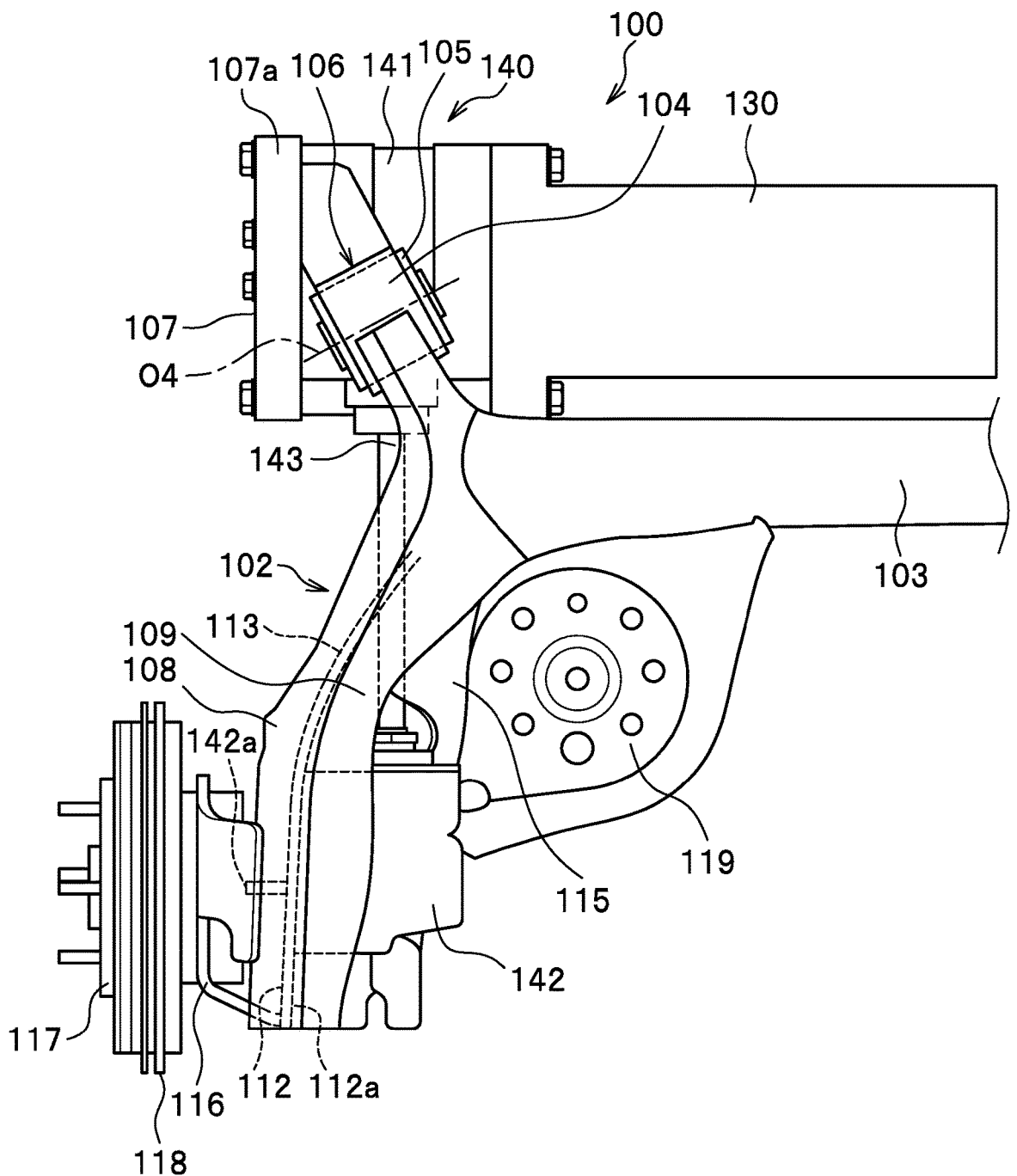
FIG. 8 is an enlarged plan view showing the trailing arm and the vicinity thereof, arranged on the left side, as shown in FIG. 7.

As shown in FIGS. 8 and 9, each of the trailing arms 102 extends substantially in the vehicle front-rear direction. Each of the trailing arms 102 has a vehicle body-side attachment portion 106 formed on a front side of the trailing arm 102. In addition, each of the trailing arms 102 has, on a rear side thereof, a mounting portion 112a for mounting a second gearbox 142 and a wheel-side support member 116 for supporting a rear wheel 170. Moreover, a reinforcing member 115 is disposed on a lower side of the trailing arm 102. Hereinafter, those constituent elements are described in detail with reference to FIGS. 8 to 11.

Figure 10A:
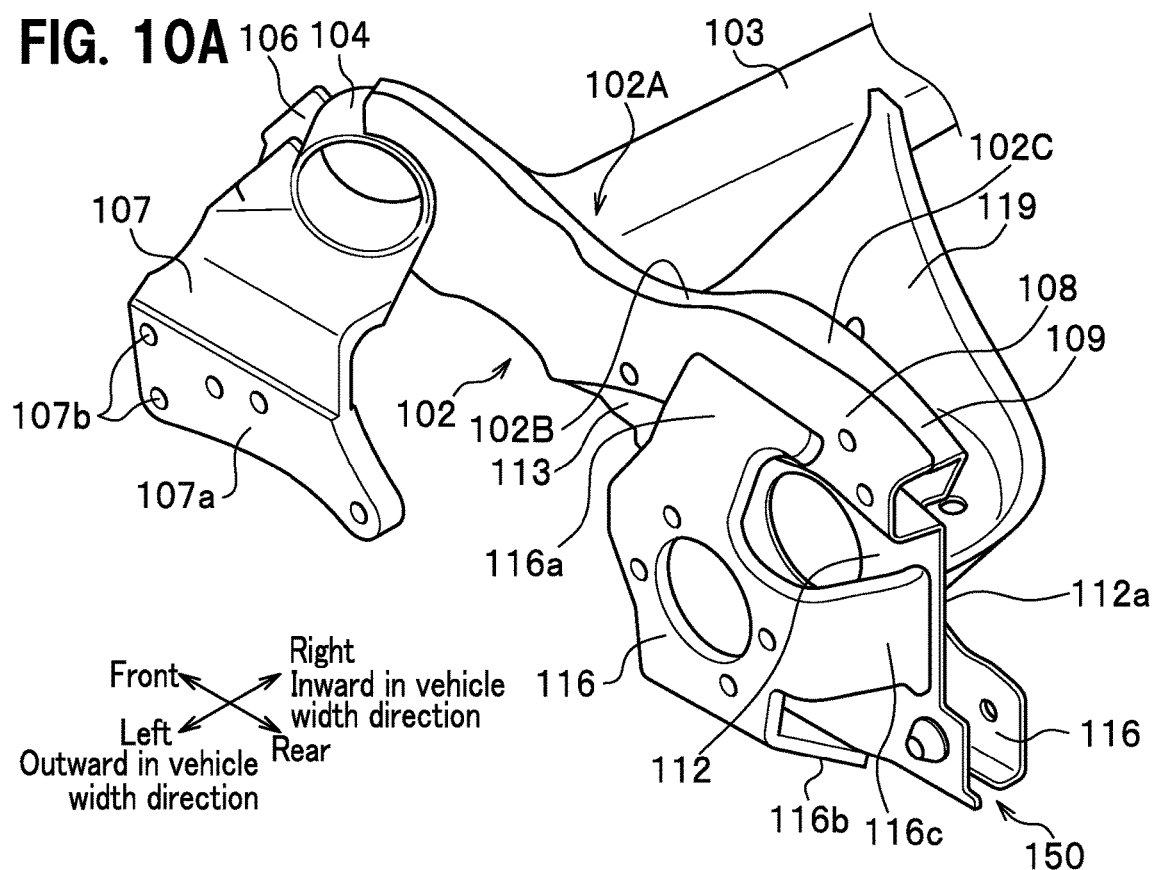
FIG. 10A is an external perspective view of the trailing arm as viewed from rear on an outer side in a vehicle width direction.

As shown in FIG. 10A, the vehicle body-side attachment portion 106 has a collar member 104 made of a metal and a rubber bush 105 that is an elastic member and is press-fitted into the collar member 104. Although not particularly illustrated, the vehicle body-side attachment portion 106 is coupled to a vehicle body-side frame via a fastening member such as a bolt and is swingably supported around an axis O4.

As shown in FIG. 10A, a motor bracket 107 is formed integrally with the vehicle body-side attachment portion 106 on a lower side thereof. The motor bracket 107 has a gearbox support portion 107a with a vertical surface extending along the vehicle front-rear direction. The gearbox support portion 107a has a plurality of bolt insertion holes 107b penetrating therethrough in the vehicle width direction. As shown in FIG. 8, the first gearbox 141 is arranged on a vehicle width direction inner side of the gearbox support portion 107a, fastened with bolts inserted from a vehicle width direction outer side into the bolt insertion holes 107b, and thereby fixed to the motor bracket 107. Moreover, the motor 130 is fastened to the vehicle width direction inner side of the first gearbox 141 with fastening members such as a bolt and thereby supported by the motor bracket 107. Incidentally, the vehicle body-side attachment portion 106 and the motor bracket 107 according to the present invention can be formed as separate members.

As shown in FIG. 10, the trailing arm 102 includes: a forward horizontal portion 102A that extends rearward and substantially horizontally from the vehicle body-side attachment portion 106; an intermediate portion 102B that extends rearward from a rear end of the forward horizontal portion 102A and inclines upward; and a rearward horizontal portion 102C that extends rearward and substantially horizontally from a rear end of the intermediate portion 102B (see FIG. 3).

As shown in FIG. 9, in plan view, the intermediate portion 102B of the trailing arm 102 inclines such that it is located toward the vehicle width direction outer side as it extends rearward.

As shown in FIG. 9, the trailing arm 102 includes a metal-made outer member 108 disposed on a vehicle width direction outer side and a metal-made inner member 109 disposed on a vehicle width direction inner side. As shown in FIG. 11, the outer member 108 has an outer U-shaped portion 110 having a substantially U-shaped cross-sectional shape and having an opening that opens inward in the vehicle width direction, and the inner member 109 has an inner U-shaped portion 111 having a substantially U-shaped cross-sectional shape and having an opening that opens outward in the vehicle width direction. An end portion of the outer U-shaped portion 110 and an end portion of the inner U-shaped portion 111 are welded to each other to form a main body portion 120 having a closed cross-sectional shape. The main body portion 120 has the closed cross-sectional shape throughout the forward horizontal portion 102a, the intermediate portion 102B, and the rearward horizontal portion 102C, and thus the trailing arm 102 has high strength and rigidity.

As shown in FIG. 11, a front-rear direction intermediate portion and a front-rear direction rearward portion of the outer member 108 extend downward further than the inner member 109. In other words, the outer member 108 has a widening portion 114 extending rearward from the front-rear direction intermediate portion and widening downward. The widening portion 114 includes a portion of the outer U-shaped portion 110 (portion included in the intermediate portion 102B and the rearward horizontal portion 102C) and a portion extending downward from the portion of the outer U-shaped portion 110. The portion extending downward from the portion of the outer U-shaped portion 110 includes: a rearward wall portion 112 that extends downward from a portion of the outer U-shaped portion 110 that constitutes the rearward horizontal portion 102C, and a forward wall portion 113 that extends along the intermediate portion 102B and under the intermediate portion 102B.

As shown in FIG. 10, the rearward wall portion 112 is a plate-like wall portion extending in the front-rear direction and up-down direction and is overlapped with the rearward horizontal portion 102C in plan view. The vehicle width direction inner side surface of the rearward wall portion 112 serves as a seat surface for mounting the second gearbox 142, i.e., the mounting portion 112a. In other words, according to the structure of the vehicle suspension device 101, the mounting portion 112a, on which the second gearbox 142 (drive mechanism) is mounted, is formed on a portion of the widening portion 114 (rearward wall portion 112) that is located inward in the width direction thereof.

The rearward wall portion 112 (mounting portion 112a) has a through-hole 112b penetrating a portion of the rearward wall portion 112 that is located central with respect to the front-rear and up-down directions thereof. This through-hole 112b is a hole for passing through an output shaft 142a of the second gearbox 142 mounted on the mounting portion 112a (see FIG. 8). The mounting portion 112a has, around the through-hole 112b, four fastening through-holes 112c for passing through bolts for fastening the second gearbox 142 to the mounting portion 112a (see FIG. 10B). The through-hole 112b and the fastening through-holes 112c may be formed according to the specification of the gearbox and thus the number and arrangement of the holes are not limited to the example described for the present embodiment.

Figure 10B:
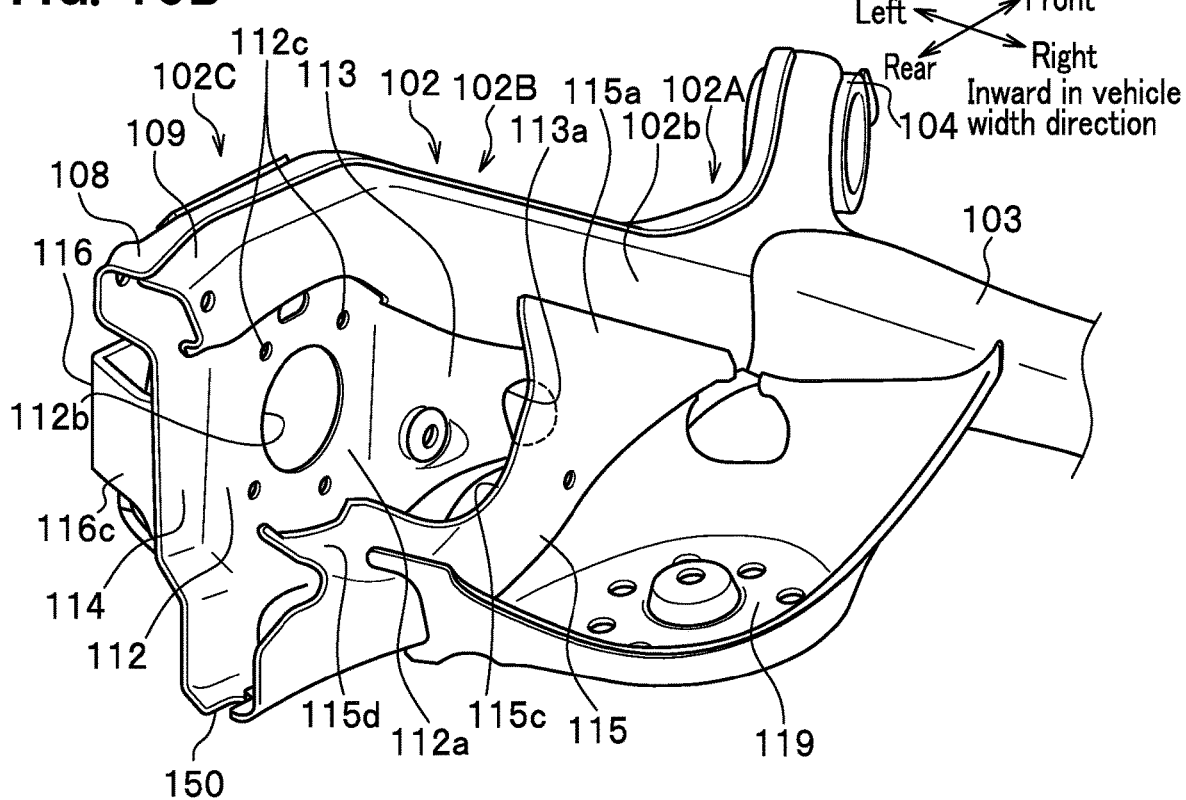
FIG. 10B is an external perspective view of the trailing arm as viewed from rear on an inner side in a vehicle width direction.

As shown in FIG. 10B, the forward wall portion 113 is a plate-like portion extending downward from the intermediate portion 102B and is contiguously formed with a forward end portion of the rearward wall portion 112. As shown in FIG. 8, the forward wall portion 113 is overlapped with the intermediate portion 102B in plan view. In other words, the forward wall portion 113 inclines such that it is located toward the vehicle width direction inner side as it extends forward from the forward end portion of the rearward wall portion 112. As a result, the forward wall portion 113 covers the front side of the second gearbox 142 mounted on the mounting portion 112a. As a result, it is possible to prevent scattered stones (chipping) from the front from colliding with the second gearbox 142. As shown in FIG. 10B, a transmission shaft insertion hole 113a is formed penetrating the forward wall portion 113 in the front-rear direction to allow passing a transmission shaft 143 such as a drive shaft that transmits the driving force from the gear transmission mechanism 140.

With this structure, it is not necessary to form the trailing arm 102 and the mounting portion 112a as separate members and thus the number of components and number of portions to be welded can be reduced. Incidentally, the widening portion 114 (rearward wall portion 112 and forward wall portion 113) has a lower end at which a flange 114a extending inward in the vehicle width direction is formed, and a reinforcing member 115, details of which are described later, is fixed to the flange 114a to improve the strength and rigidity of the widening portion 114.

As shown in FIG. 10B, the reinforcing member 115, made of a metal, is disposed on a vehicle width direction inner side of the widening portion 114 (rearward wall portion 112 and forward wall portion 113). The reinforcing member 115 has a forward end portion 115a bonded to an inner surface 102b of the intermediate portion 102B that is on the vehicle width direction inner side. As shown in FIG. 11, the reinforcing member 115 has a lower end portion 115b bent outward in the vehicle width direction and bonded to the flange 114a of the widening portion 114 (rearward wall portion 112 and forward wall portion 113).

This structure supports the lower portion of the widening portion 114 (rearward wall portion 112 and forward wall portion 113) and improves the strength and rigidity of the widening portion 114.

Moreover, the lower end portion 115b of the reinforcing member 115 and the flange 114a of the widening portion 114, which are bonded to each other, cover the lower side of the second gearbox 142 and thus protect the second gearbox 142 from being collided with scattered stones (chipping) from the under side.

Moreover, at a rear end of the wall portion made up by bonding the lower end portion 115b of the reinforcing member 115 and the flange 114a of the widening portion 114 to each other, a damper support portion 150 having an opening that opens substantially rearward and being substantially U-shaped in plan view is formed. The damper support portion 150 supports a lower end portion of a suspension damper not shown. The damper support portion 150 of the present embodiment is constructed by combining a notch formed on the flange 114a of the widening portion 114 and a notch formed on the lower end portion 115b of the reinforcing member 115. Incidentally, the damper support portion 150 may be formed on a rear end of the main body portion 120.

The reinforcing member 115 has an upper end portion 115c that inclines such that it extends downward as it extends rearward. Thus, the second gearbox 142 mounted on the mounting portion 112a does not in contact with the upper end portion 115c of the reinforcing member 115. The upper end portion 115c of the reinforcing member 115 includes an extended portion 115 that extends outward in the vehicle width direction. Thus, the reinforcing member 115 has a reinforced U-shaped portion 115e having an opening that opens outward in the vehicle width direction and having a U-shaped cross section (see FIG. 11). This reinforced U-shaped portion 115e and the rearward wall portion 112 (mounting portion 112a) together form a closed cross-sectional shape. Thus, this structure further improves the strength and rigidity of the rearward wall portion 112 (mounting portion 112a).

A spring seat 119 for placing a not-shown suspension spring is attached to and between the reinforcing member 115 and the torsion beam 103, and a left end portion of the spring seat 119 is bonded to the reinforcing member 115. This structure improves the strength for supporting the suspension spring. Incidentally, the reinforcing member 115 may have a plate thickness different from that of the inner member 109 or the spring seat 119.

The wheel-side support member 116 is a plate member, having a rectangular shape in side view, to which a hub 117 and a brake device 118 are attached and which supports the rear wheel 170 via the hub 117 (see FIG. 8). As shown in FIGS. 10A and 10B, wheel-side support member 116 has an upper end portion and a lower end portion at which an upper fixing portion 116a and a lower fixing portion 116b are respectively formed extending inward in the vehicle width direction and bonded to the trailing arm 102 and the mounting portion 112. In other words, the vehicle suspension device 101 of the present embodiment is provided with a fixing portion (upper fixing portion 116a, lower fixing portion 116b) for fixing the wheel-side support member to a width direction outer side of the outer member 108.

Specifically, the fixing portion includes an upper fixing portion 116a that extends inward in the vehicle width direction (toward the outer member 108) from an upper end of a central portion of the wheel-side support member 116, and a lower fixing portion 116b that extends inward in the vehicle width direction (toward the outer member 108) from a lower end of the central portion of the wheel-side support member 116. The upper fixing portion 116a and the lower fixing portion 116b are spaced apart from each other in the up-down direction. As shown in FIG. 11, the upper fixing portion 116a is bonded to the outer U-shaped portion 110 (upper portion of the widening portion 114), the lower fixing portion 116b is bonded to the flange 114a, which is a lower end portion of the widening portion 114, so that the rearward wall portion 112 (mounting portion 112a) is located between the upper fixing portion 116a and the lower fixing portion 116b. With this structure, as the vertical opposite ends of the wheel-side support member 116 are supported, even when a load is applied to the wheel-side support member 116 inward in the vehicle width direction, the wheel-side support member 116 is not likely to collapse inward in the width direction.

As shown in FIG. 11, the upper fixing portion 116a is bonded to the main body portion 120 having a closed cross-sectional shape and the lower fixing portion 116b is bonded to a portion where the widening portion 114 and the reinforced U-shaped portion 115e together form a closed cross-sectional shape. That is, the wheel-side support member 116 is bonded to portions having high strength and rigidity. For this reason, the wheel-side support member 116 is further not likely to collapse inward in the vehicle width direction.

The fixing portion of the present embodiment includes a rearward fixing portion 116c extending inward in the vehicle width direction from a rear end of the central portion of the wheel-side support member 116 and bonded to a rear end portion of the widening portion 114. This structure improves the support strength and rigidity of the wheel-side support member 116.

According to the present embodiment, the mounting portion 112a (rearward wall portion 112) supports the second gearbox 142, and the wheel-side support member 116 supports the rear wheel 170. With this structure, even when the angle of the mounting portion 112 is changed to modify the orientation of the output shaft 142a of the second gearbox 142, the axle of the rear wheel 170 is not changed. That means the wheel-side support member 116 provides a function of adjusting wheel alignment such that the angle of the axle of the rear wheel 170 can be freely set by changing the angle of the wheel-side support member 116.

In addition, vertical opposite sides of the rearward wall portion 112, which constitutes the mounting portion 112a, are supported by the portion having the closed cross-sectional shape formed by the outer member 108 and the inner member 109 (main body portion 120) and the portion having the closed cross-sectional shape formed by the outer member 108 and the reinforcing member 115, and thus are not likely to be twisted. Therefore, the rearward wall portion 112 (mounting portion 112a) has extremely high rigidity, and thus the second gearbox 142, which is a heavy object, can be reliably mounted on the rearward wall portion 112.

Moreover, as the outer U-shaped portion 110 and the mounting portion 112 are integrally formed in the widening portion 114 of the outer member 108, the number of welding operations can be reduced while maintaining the strength and rigidity.

In addition, as the transmission shaft insertion hole 113a is formed in the forward wall portion 113, the motor 130 and the first gearbox 141 are able to be disposed forwardly of the forward wall portion 113 (second gearbox 142). That means, according to the structure of the forward wall portion 113 of the embodiment, the degree of freedom of laying out the motor 130 or the like is secured while improving the rigidity of the mounting portion 112.

The vehicle suspension device of the embodiment has been described. However, the present invention is not limited to the embodiment. The description of the embodiment has been given of a case where the present invention is applied to a torsion beam suspension device in which a torsion beam 103 is integrally formed with left and right trailing arms 102. However, the present invention may be applied to a trailing-arm suspension devise made up of trailing arms 102 and a spring seat 119. Even in such a case, the present invention provides advantageous effects similar to those of the embodiment.

According to the present embodiment, an upper portion (outer U-shaped portion 110) of the widening portion 114 of the outer member 108 and the inner member 109 together form the main body portion 120, and the rearward wall portion 112 extends downward from the outer U-shaped portion 110. However, a device according to the present invention may use an outer member with a widening portion 114 such that a rearward wall portion 112 extends upward from an outer U-shaped portion 110. If such an outer member 108 is used, the inner member 109 should be such that the inner member 109 and an outer U-shaped portion 110 formed on a lower portion of the outer member 108 together form a main body portion 120. Moreover, when using the reinforcing member 115, it is preferable that the reinforcing member 115 is bonded to an upper end portion of the widening portion 114 extending upward from the outer U-shaped portion 110, so that a closed cross-sectional shape is formed above the mounting portion 112a.

Moreover, although the vehicle suspension device 101 of the embodiment has the reinforcing member 115, if, in the present invention, the outer member 108 and the inner member 109 provides sufficient strength and rigidity, the reinforcing member 115 may be omitted.

In addition, although the fixing portion of the embodiment has the rearward fixing portion 116c, if, in the present embodiment, the upper fixing portion 116a and the lower fixing portion 116b can sufficiently support the wheel-side support member 116, the rearward fixing portion 116c may be omitted. In addition, if it is necessary to increase the support strength and rigidity of the wheel-side support member 116, the fixing portion may further include another portion bonded to a forward end portion of the widening portion 114.

REFERENCE SIGNS LIST 1 motor drive device
2 trailing arm
3 motor
4 gear transmission mechanism
5 rubber bush (elastic member)
6 vehicle body-side attachment portion
7 wheel-side support portion
12 second gearbox support surface portion
18 torsion beam
20 motor bracket
21 first gearbox support surface portion
23 first gear unit
24 first gearbox
34 constant velocity joint
38 first transmission shaft
43 second gear unit
49 second gearbox
54 second transmission shaft
71 rear wheel (wheel)
72 floor panel
74 seat
100 rear wheel drive device
101 vehicle suspension device
102 trailing arm
102A forward horizontal portion
102B intermediate portion
102C rearward horizontal portion
103 torsion beam
108 outer member
109 inner member
110 outer U-shaped portion
111 inner U-shaped portion
112 rearward wall portion
112a mounting portion
113 forward wall portion
113a transmission shaft insertion hole
114 widening portion
114a flange
115 reinforcing member
115e reinforced U-shaped portion
116 wheel-side support member
116a upper fixing portion (fixing portion)
116b lower fixing portion (fixing portion)
116c rearward fixing portion (fixing portion)
117 hub
118 brake device
119 spring seat
120 main body portion
130 motor
140 gear transmission mechanism
141 first gearbox
142 second gearbox (drive mechanism)

143 transmission shaft
150 damper support portion
170 rear wheel

The invention claimed is:

1. A motor drive device comprising:
a trailing arm that extends in a vehicle front-rear direction and comprises a vehicle body-side attachment portion and a wheel-side support portion, the vehicle body-side attachment portion formed on a front side of the trailing arm and coupled to a vehicle body via an elastic member, the wheel-side support portion formed on a rear side of the trailing arm and supporting a wheel; and
a motor that is supported by the trailing arm and drives the wheel,
wherein the motor and the elastic member are disposed in such a way that the motor and the elastic member are seen as being substantially aligned in a vehicle up-down direction when viewed in a vehicle width direction.

2. The motor drive device of claim 1,
wherein the trailing arm further comprises a motor bracket which extends downward from the vehicle body-side attachment portion and to which the motor is attached.

3. The motor drive device of claim 2, further comprising a gear transmission mechanism that transmits power of the motor to the wheel,
wherein the gear transmission mechanism has a gearbox arrangement attached to the trailing arm as a rigid body,
wherein the gearbox arrangement comprises a first gearbox and a second gearbox arranged separately from each other, the first gearbox housing a first gear unit disposed about a rotating shaft of the motor, the second gearbox spaced apart from the first gearbox and housing a second gear unit disposed about a rotating shaft of the wheel.

4. The motor drive device of claim 3,
wherein the first gearbox is attached to the motor bracket.

5. The motor drive device of claim 4,
wherein the trailing arm includes a first gearbox support surface portion formed on the motor bracket and a second gearbox support surface portion spaced apart from the first gearbox support surface portion in the vehicle front-rear direction,
wherein the first gearbox is attached to the first gearbox support surface portion, and
wherein the second gearbox is attached to the second gearbox support surface portion.

6. The motor drive device of claim 4,
wherein the motor is attached to the motor bracket via the first gearbox.

7. The motor drive device of claim 3,
wherein the gear transmission mechanism includes a bending mechanism for absorbing a twist that occurs between the first gearbox and the second gearbox due to deformation of the trailing arm.

8. The motor drive device of claim 7,
wherein the bending mechanism is a constant velocity joint.

9. The motor drive device of claim 3,
wherein the gear transmission mechanism comprises:
a first transmission shaft extending from the first gearbox; and
a second transmission shaft extending from the second gearbox and spline coupled to the first transmission shaft.

10. The motor drive device of claim 1,
wherein a torsion beam extending in the vehicle width direction is attached to the trailing arm,
wherein a seat is disposed forwardly of the torsion beam, and
wherein the motor is located between the torsion beam and the seat.

11. The motor drive device of claim 1,
wherein the motor partially projects downward further than a lower surface of a floor panel of the vehicle body.

12. The motor drive device of claim 1,
wherein the wheel-side support portion has a wheel-side support member with a function of adjusting alignment of the wheel,
wherein the trailing arm is made up of an outer member and an inner member disposed opposite to each other in the width direction of the vehicle and together forming a main body portion with a closed cross-sectional shape,
wherein the outer member has an intermediate portion that is located intermediate between front and rear ends of the outer member and a widening portion extending rearward from the intermediate portion and widening in the up-down direction of the vehicle,
wherein the wheel-sided support member has a fixing portion fixed to a width direction outer side of the widening portion, and
wherein the widening portion has a mounting portion which is on an inner side in the width direction and on which a drive mechanism is mounted.

13. The motor drive device of claim 12,
wherein the trailing arm further includes a reinforcing member bonded to the inner member and extending on a rear end side,
wherein the inner member and the reinforcing member are disposed such that a rearward portion of the inner member and a rearward portion of the reinforcing member are spaced apart from each other in the up-down direction, and
wherein the mounting portion is located between the inner member and the reinforcing member.

14. The motor drive device of claim 12,
wherein the fixing portion comprises an upper fixing portion and a lower fixing portion spaced apart from each other in the up-down direction, and
wherein the mounting portion is located between the upper fixing portion and the lower fixing portion.

15. The motor drive device of claim 12,
wherein the widening portion includes a forward wall portion that covers a front side of the drive mechanism mounted on the mounting portion, and
wherein the forward wall portion has an opening that opens in the vehicle front-rear direction.

16. The motor drive device of claim 12, further comprising a spring seat that is fixed to the trailing arm and supports a lower end side of a suspension spring,
wherein the inner member is disposed on an upper side relative to the mounting portion,
wherein the reinforcing member is disposed on an lower side relative to the mounting portion, and
wherein the spring seat is fixed to the reinforcing member.

* * * * *